United States Patent
Palai et al.

(10) Patent No.: US 12,094,266 B2
(45) Date of Patent: Sep. 17, 2024

(54) LAYERED ELECTRICAL ARCHITECTURE FOR VEHICLE DIAGNOSTICS

(71) Applicant: JAGUAR LAND ROVER LIMITED, Coventry (GB)

(72) Inventors: Dibyendu Palai, Leamington Spa (GB); Sachin Shinde, Solihull (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/385,615

(22) Filed: Oct. 31, 2023

(65) Prior Publication Data
US 2024/0062595 A1 Feb. 22, 2024

Related U.S. Application Data

(63) Continuation of application No. 17/639,297, filed as application No. PCT/EP2020/073937 on Aug. 27, 2020, now Pat. No. 11,842,582.

(30) Foreign Application Priority Data

Aug. 30, 2019 (GB) .................................... 1912488.2

(51) Int. Cl.
*G08B 21/00* (2006.01)
*B60W 50/02* (2012.01)
(Continued)

(52) U.S. Cl.
CPC ....... *G07C 5/0808* (2013.01); *B60W 50/0205* (2013.01); *G07C 5/008* (2013.01); *H04L 67/12* (2013.01)

(58) Field of Classification Search
CPC . G07C 5/0808; G07C 5/008; B60W 50/0205; H04L 67/12; G05B 2219/2637; G05B 19/0421
See application file for complete search history.

(56) References Cited

U.S. PATENT DOCUMENTS 6,330,499 B1 * 12/2001 Chou ....................... G07C 5/08
701/32.7
6,766,230 B1 * 7/2004 Rizzoni .............. G05B 23/0251
701/32.9
(Continued)

OTHER PUBLICATIONS

"Next-Generation Diagnostics for HPC-based Connected Vehicles", DSA; HPC Diagnostics—Proposal Workshop, Hohenkirchen, Germany, dated May 6, 2019, 30 pages.
(Continued)

*Primary Examiner* — Toan N Pham
(74) *Attorney, Agent, or Firm* — Reising Ethington P.C.

(57) ABSTRACT

A method of performing diagnostics in a hierarchical diagnostics electrical architecture of a vehicle, the vehicle comprising a plurality of on-board computing devices for hosting the hierarchical diagnostics electrical architecture. The hierarchical diagnostics electrical architecture comprising: a component diagnostic layer having a plurality of electronic control units each comprising a diagnostics server module; and at least one supervisory diagnostic layer. The method comprising: receiving into the diagnostics server modules sensor output data from one or more on-board vehicle sensors; performing, by the diagnostics server modules, one or more diagnostic tasks based on the received sensor output data to generate one or more component-level diagnostic notifications; receiving into the at least one supervisory layer the component-level diagnostic notifications from each of a group of the plurality of electronic control units; and aggregating in the at least one supervisory layer the received component-level diagnostic notifications to generate a supervisory-level diagnostic notification.

20 Claims, 14 Drawing Sheets

(51) Int. Cl.
*G07C 5/00* (2006.01)
*G07C 5/08* (2006.01)
*H04L 67/12* (2022.01)

(56) References Cited

U.S. PATENT DOCUMENTS

| | | |
|---|---|---|
| 2004/0078125 A1* | 4/2004 | Woodard ............... G07C 5/008 |
| | | 701/29.3 |
| 2009/0295559 A1 | 12/2009 | Howell et al. |
| 2010/0057511 A1 | 3/2010 | Mansouri |
| 2018/0182184 A1 | 6/2018 | Zoppelt et al. |
| 2018/0232959 A1 | 8/2018 | Thornburg et al. |
| 2019/0066399 A1 | 2/2019 | Jiang et al. |

OTHER PUBLICATIONS

Combined Search and Examination report corresponding to Great Britain Application No. GB1912488.2, Feb. 26, 2020, 8 pages.
Great Britain Office Action corresponding to Great Britain Application No. GB1912488.2, dated Dec. 23, 2021, 5 pages.
International Search Report corresponding to International Application No. PCT/EP2020/073937, dated Nov. 27, 2020, 5 pages.
Written Opinion corresponding to International Application No. PCT/EP2020/073937, dated Nov. 27, 2020, 9 pages.
Thomas Falschebner, "Why do we need a new Diagnostics for HPC Systems", Porsche Ag; HPC Diagnostics—Proposal Workshop, Hohenkirchen, Germany, dated May 6, 2019, 8 pages.

* cited by examiner

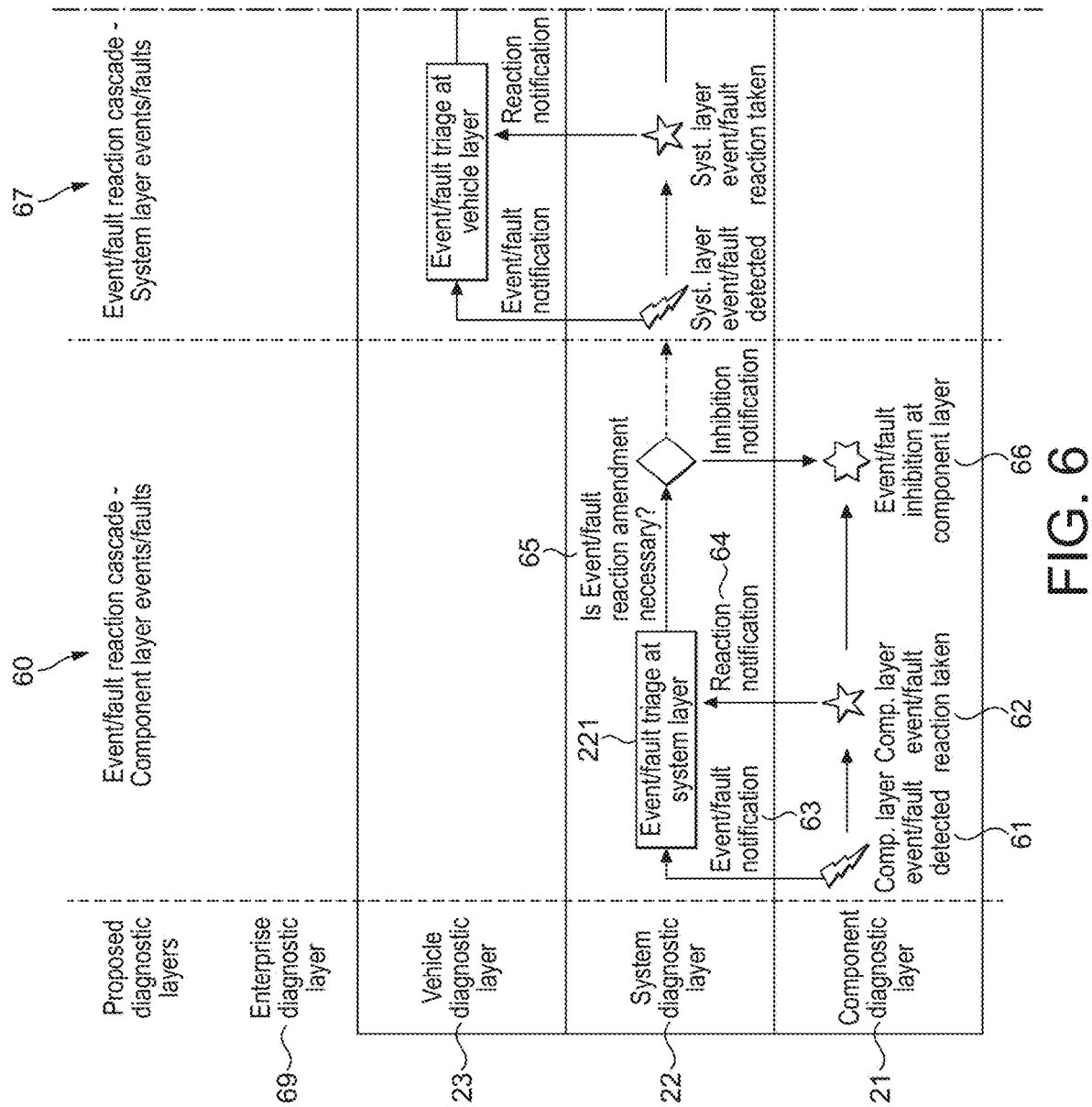

LAYERED ELECTRICAL ARCHITECTURE FOR VEHICLE DIAGNOSTICS

TECHNICAL FIELD

The present disclosure relates to a diagnostics electrical architecture for a vehicle and, in particular, a hierarchical diagnostics electrical architecture hosted on a plurality of vehicle on-board computing devices. Aspects of the invention relate to a vehicle diagnostics electrical architecture, to a method, to a computer-readable medium, and to a vehicle.

BACKGROUND

Modern vehicles, e.g. road vehicles such as cars, include a number of embedded electronic control units, components or modules (ECUs) for controlling and performing a number of functions of the vehicle. Examples of such ECUs may include an anti-lock braking system (ABS), a powertrain control module (PCM), a transmission control module (TCM), an instrument panel cluster (IPC), an ADAS domain controller (ADC), an engine management system (EMS), an air conditioning module (ACM), etc. Typically, each vehicle ECU is connected to a number of sensors of the vehicle and receives sensor data from the sensors as input, together with signals from other parts of the vehicle. The electronic parts or software of an ECU, or the sensors connected to an ECU, can fail or develop faults. Many ECUs will include a local diagnostics server having self-diagnostic capabilities including being able to identify and report faults, and perhaps perform self-repair of faults. Currently, diagnostic testing of a vehicle involves a diagnostic tester—which can be on-board or off-board the vehicle—establishing a point-to-point (p2p) diagnostic communication between the diagnostic tester and a local diagnostics server of any ECU of the vehicle. In particular, such diagnostic communication is made via a single central gateway that acts as a router for diagnostic messages to particular local diagnostic servers, specifically to route diagnostic messages between different transport protocols. There are many potential disadvantages or drawbacks associated with the above-described present vehicle diagnostic architecture. These include, but are not limited to, static diagnostic configuration, lack of diagnostic redundancy, limitation to component-based diagnostics, diagnostic access limited to one tester at a time, and no logical and physical separation between external testers and vehicle modules leading to security risks. It is an aim of the present invention to address one or more of the disadvantages associated with the prior art.

SUMMARY

According to an aspect of the present invention there is provided a hierarchical diagnostics electrical architecture for a vehicle. The vehicle comprises a plurality of on-board computing devices for hosting the hierarchical diagnostics electrical architecture. The hierarchical diagnostics electrical architecture comprises a component diagnostic layer comprising a plurality of electronic control units each comprising a diagnostics server module. Each diagnostics server module is arranged to receive sensor output data from one or more on-board vehicle sensors, and perform one or more diagnostic tasks based on the received sensor output data to generate one or more component-level diagnostic notifications. The hierarchical diagnostics electrical architecture comprises at least one supervisory diagnostic layer arranged to receive the component-level diagnostic notifications from each of a group of the plurality of electronic control units, and aggregate the received component-level diagnostic notifications to generate a supervisory-level diagnostic notification.

The one or more component-level diagnostic notifications may include a fault code associated with the one or more on-board vehicle sensors and/or input/output connections of the electronic control units. The generated supervisory-level diagnostic notification may be a fault or event notification. The fault or event notification may be stored in an on-board supervisory-level database. The generated supervisory-level diagnostic notification may be a reaction amendment or inhibition signal sent to one or more of the electronic control units in the component diagnostic layer. The generated supervisory-level diagnostic notification may be arranged to be transmitted to an external diagnostic tester off-board the vehicle. The at least one supervisory diagnostic layer may comprise a system diagnostic layer and a vehicle diagnostic layer at a higher level of the architecture than the system diagnostic layer. The vehicle diagnostic layer may be arranged to be in diagnostic communication with one or more external diagnostic testers off-board the vehicle. The supervisory-level diagnostic notifications may comprise system-level diagnostic notifications in the system diagnostic layer, wherein one or more system-level diagnostic notifications may be generated for each of a plurality of groups of electronic control units, and wherein vehicle diagnostic layer may be arranged to receive the system-level diagnostic notifications and aggregate the received system-level diagnostic notifications to generate a vehicle-level diagnostic notification. The system diagnostic layer may comprise a plurality of application service modules, where each application service module may be arranged to generate the one or more system-level diagnostic notifications for one of the groups of electronic control units. Each of the application service modules may comprise a local diagnostic agent arranged to generate the one or more system-level diagnostic notifications. The one or more system-level diagnostic notifications may include a fault code associated with the one or more of the electronic control units, and/or input/output states of the application service module, and/or internal states of the application service module.

The system diagnostic layer may be arranged to communicate directly with on-board diagnostic testers of the vehicle. The vehicle diagnostic layer may be hosted on a central compute platform of a network of the vehicle. The system diagnostic layer may be hosted on one or more remote input/output modules and/or the central compute platform of the network of the vehicle. The component diagnostic layer may be hosted on one or more peripheral modules and/or one or more remote input/output modules of the network of the vehicle.

Aggregating the received component-level notifications may comprise determining a validity of the received sensor output data based on a sensor data functional operating range determined in the at least one supervisory layer. Aggregating the received component-level notifications may comprise performing triaging of the component-level notifications. Aggregating the received component-level notifications may comprise performing supervisory-level network event/fault monitoring. Aggregating the received component-level notifications may comprise performing supervisory-level secure event/fault monitoring.

The at least one supervisory layer may comprise a diagnostic database arranged to store the generated supervisory-level diagnostic notifications.

According to another aspect of the present invention there is provided a vehicle comprising a hierarchical diagnostics electrical architecture as described above.

According to another aspect of the present invention there is provided a method of performing diagnostics in a hierarchical diagnostics electrical architecture of a vehicle. The vehicle comprises a plurality of on-board computing devices for hosting the hierarchical diagnostics electrical architecture. The hierarchical diagnostics electrical architecture comprises a component diagnostic layer having a plurality of electronic control units each comprising a diagnostics server module, and at least one supervisory diagnostic layer. The method comprises receiving into the diagnostics server modules sensor output data from one or more on-board vehicle sensors, and performing, by the diagnostics server modules, one or more diagnostic tasks based on the received sensor output data to generate one or more component-level diagnostic notifications. The method comprises receiving into the at least one supervisory layer the component-level diagnostic notifications from each of a group of the plurality of electronic control units, and aggregating in the at least one supervisory layer the received component-level diagnostic notifications to generate a supervisory-level diagnostic notification.

According to another aspect of the present invention there is provided a non-transitory computer-readable storage medium storing instructions thereon that when executed by one or more processors causes the one or more processors to perform the method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
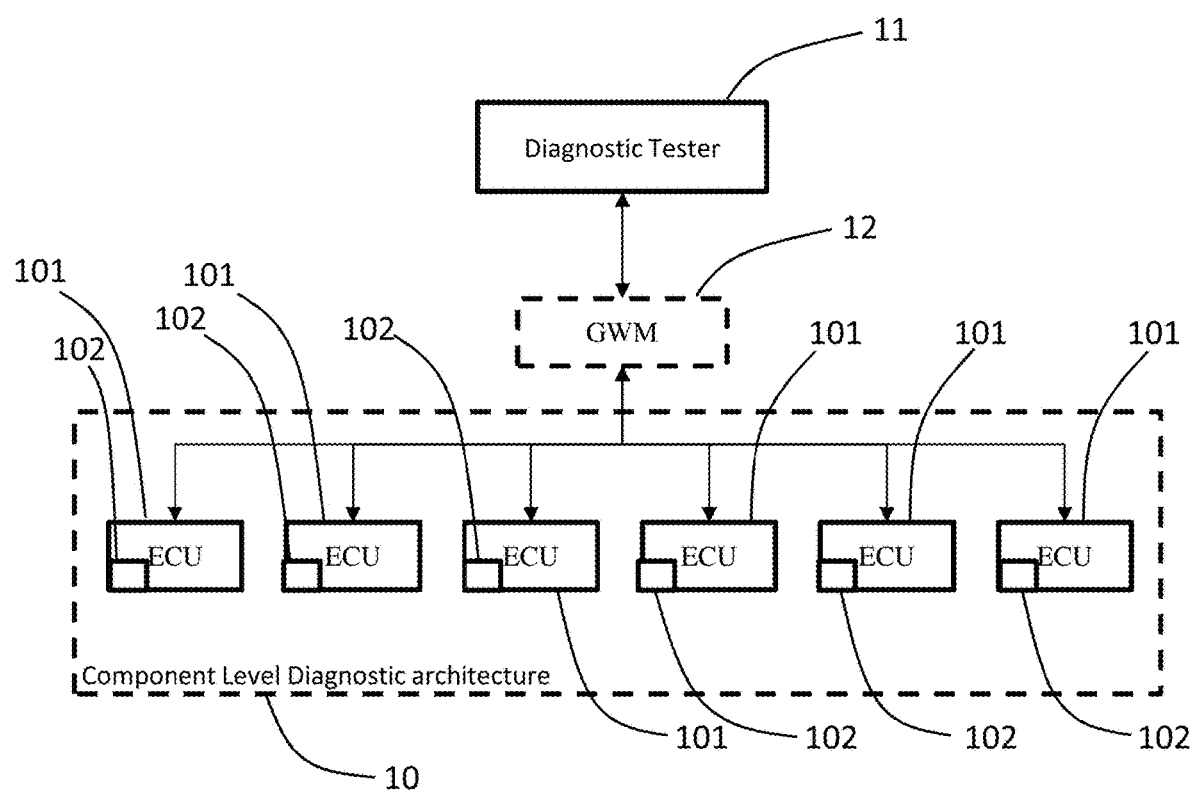
FIG. 1 illustrates a vehicle diagnostics electrical architecture having a flat, non-hierarchical structure.

FIG. 1 illustrates a point-to-point diagnostic architecture 10 for a vehicle. This may also be referred to as a component-level diagnostic architecture 10. The vehicle diagnostic architecture 10 has a plurality of electronic control units, components or modules (ECUs) 101 arranged logically in a flat, non-hierarchical structure. The ECUs 101 each perform separate functions and may include an anti-lock braking system module (ABS), a powertrain control module (PCM), a transmission control module (TCM), an instrument panel cluster (IPC), an ADAS domain controller (ADC), an engine management system (EMS), and/or an air conditioning module (ACM). It will be understood that the vehicle diagnostic architecture 10 may include any number of suitable ECUs. Typically, the vehicle may include 40 to 60 ECUs.

Each of the ECUs 101 of the diagnostic architecture 10 can communicate with a diagnostic tester 11 on-board or off-board the vehicle. Indeed, the diagnostic tester 11 is able to directly establish diagnostic communication paths with any of the on-board ECUs 101. The diagnostic tester 11 is therefore able to initiate diagnostic communication and execute various diagnostic tasks, such as initiating on-demand self-tests (ODST) of any of the ECUs 101 so that faults associated with the ECUs are reported back to the tester 11. In particular, diagnostic communication between each ECU 101 and the diagnostic tester 11 is made using a gateway module (GWM) 12. The diagnostic tester 11 may be any suitable vehicle diagnostic tester, e.g. an engineering, manufacturing or service tester, a connected diagnostics tester, or an on-board diagnostic or software-over-the-air (SOTA) tester. Indeed, vehicles commonly have a number of different diagnostic testers that communicate with on-board ECUs.

Each of the ECUs 101 of the diagnostic architecture 10 has a local diagnostic server or module 102. Each diagnostics server 102 is arranged to perform self-diagnosis operations associated with its respective ECU 101, including identifying, reporting and/or repairing faults or failures of parts or software of the ECU 101, or sensors associated with the ECU 101. The diagnostic server 102 then reports back to the diagnostic tester 11 any identified faults or errors, and notifies the diagnostic tester 11 of any self-repair operations that have been performed.

The ECUs 101 of the diagnostic architecture 10 are part of different networks present in the vehicle, such as CAN (Controller Area Network), LIN (Local Interconnect Network), FlexRay and Ethernet. Each of these networks has different protocols and data transmission rates. For instance, LIN is used for low-speed networks like sensors and actuators with a data rate of around 20 kbps, CAN may be used for communication between different ECUs with a data rate of around 1 to 5 Mbps, FlexRay may be used for safety-critical applications with a data rate of around 10 Mbps, and Ethernet may be used for infotainment systems, advanced driver assistance systems (ADAS), and wireless interfaces, e.g. 4G, Wi-Fi, etc., with a data rate ranging from megabits per second to gigabits per second.

The GWM 12 provides a single point of entry—from a logical viewpoint—for communication between the diagnostic tester 11 and the component-level diagnostic architecture 10 having the ECUs 101. The GWM 12 acts as a router for diagnostic messages from one network to another, e.g. from Ethernet frames to CAN bus frames and vice versa. In particular, the GWM 12 bridges between the external or off-board network of the diagnostic tester 11 and internal or on-board networks of the vehicle ECUs 101. The diagnostic protocol used between the diagnostic tester 11 and the ECUs 101 is the Unified Diagnostics Services (UDS) protocol. The standardised diagnostic transport protocol DoIP is used in combination with the UDS protocol to package diagnostic messages in Ethernet frames for communication of the diagnostic tester 11 with the vehicle ECUs 101. The GWM 12 therefore routes the DoIP Ethernet frames from the diagnostic tester 11 to the relevant transport protocol for the particular ECU 101 to which the diagnostic message is to be sent, e.g. CAN, LIN, FlexRay frames etc.

A single fault or failure in the vehicle may result in faults across a number of the ECUs 101. Each of the ECUs 101 will detect and report the faults pertinent to, or associated with, that particular ECU 101, and report these back to the diagnostic tester 11. This means that the diagnostic tester 11 may receive multiple fault codes—also referred to as diagnostic trouble codes (DTCs)—from multiple different ECUs 101. The diagnostic tester 11—or an engineer or service technician—must then analyse and interpret the received DTCs to determine the root cause of the multiple DTCs and therefore the correct diagnostic repair that needs to be performed.

Although many different diagnostic testers may access the ECUs 101, only a single diagnostic tester can establish diagnostic communication with the component-level diagnostic architecture 10 at any one time. Relative levels of priority between different diagnostic testers may therefore be set up in the GWM 12. For instance, a third party off-board tester such as an OBD scan tool or insurance dongle may be assigned a highest priority, a manufacturer off-board tester may be assigned as next highest priority, and an on-board SOTA may be assigned a lowest priority.

Figure 2:
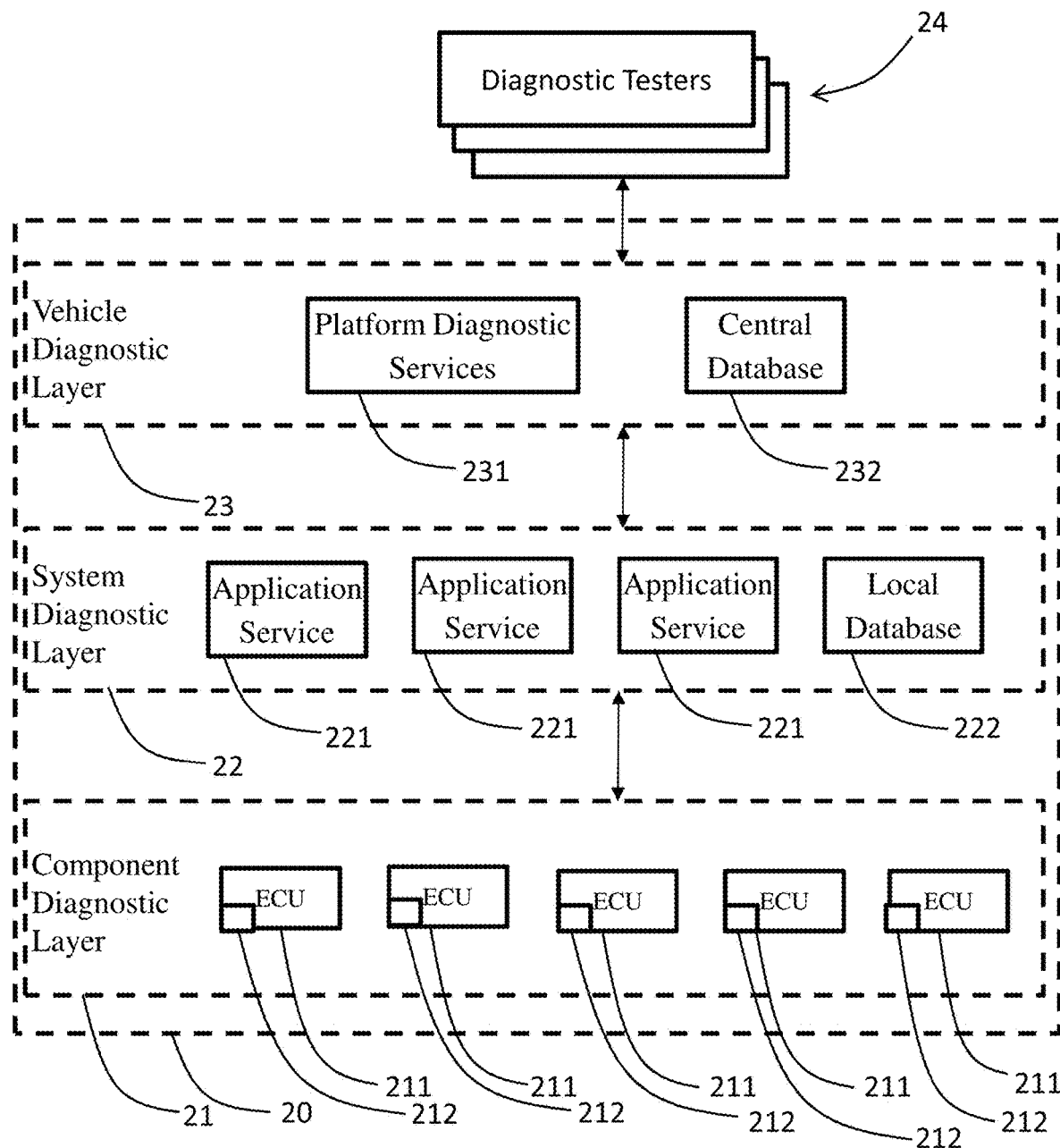
FIG. 2 illustrates a vehicle diagnostics electrical architecture according to an example of an aspect of the invention, the diagnostics electrical architecture having a hierarchical structure including a number of layers.

FIG. 2 illustrates a hierarchical diagnostic architecture 20 for a vehicle. This may also be referred to as a layered diagnostic architecture 20. Unlike the non-hierarchical architecture 10 of FIG. 1, the hierarchical architecture 20 includes a number of diagnostic layers 21, 22, 23. Similarly to the non-hierarchical architecture 10 of FIG. 1, the hierarchical architecture 20 has a component diagnostic layer 21 including a number of ECUs 211 each for performing different functions on the vehicle.

Each of the ECUs 211 of the hierarchical diagnostic architecture 20 has a local diagnostic server or module 212. Each diagnostic server 212 provides the capability to read fault record data associated with the associated ECU 211 and to initiate ECU self-tests to determine whether all of the inputs and outputs to the ECU are connected, configured and functioning as designed, and that the parts or software of the ECU, as well as the sensors connected to the ECU, are functioning correctly. In addition to these 'pull' mechanisms for retrieving fault data from the ECUs 211, the ECUs 211 are able to 'push' or transmit fault data to higher levels or layers 22, 23 of the hierarchical diagnostic architecture 20, for example when a fault is detected or upon predefined events or triggers occurring.

Unlike the non-hierarchical architecture 10 of FIG. 1, the hierarchical architecture 20 also includes two supervisory diagnostic layers 22, 23 over or between the component diagnostic layer 21 and diagnostic testers 24 on-board or off-board the vehicle arranged to make diagnostic communication with the hierarchical diagnostic architecture 20. The provision of such supervisory layers 22, 23 enables diagnostic monitoring and reporting to be made at a higher level than the component level diagnostics provided by the ECUs 211 in the component diagnostic layer 21. Whereas diagnostics performed in the component diagnostic layer 21 is restricted to determining and reporting faults associated with particular ECUs in isolation from other ECUs, supervisory layers have an overview of a number of different ECUs 211 in the lower layer 21 and, as such, diagnostics performed in the supervisory layers can aggregate fault data from a number of different ECUs 211—or, more generally, fault data from lower layers—to provide a clearer diagnostic overview of vehicle systems.

In the described example, the hierarchical diagnostic architecture 20 includes a system diagnostic layer 22 over the component diagnostic layer 21, and a vehicle diagnostic layer 23 over the system diagnostic layer 22 and arranged to make diagnostic communication with the diagnostic testers 24. In the system diagnostic layer 22, fault data from a plurality of the ECUs 211 is analyzed and interpreted for each of a number of so-called 'application services'. Each application service requires certain functions provided by certain individual components or ECUs 211. As an example, vehicle speed may be offered or provided as an application service of the vehicle. In order to determine vehicle speed, wheel speed sensor signals need to be provided by each of the four wheel speed sensors of the vehicle.

Diagnostics may then be performed at a 'service level' for each of the different application services that are provided based on the fault data from the relevant ECUs. In particular, the system diagnostic layer 22 includes a number of application service modules 221 each connected to a number of the ECUs 211 in the component diagnostic layer 21. Note that a given ECU 211 may provide fault data to a number of different application service modules 221. Diagnostic notifications may then be sent from the application service modules 221 to a higher layer of the architecture 20, in this case the vehicle diagnostic layer 23. The system diagnostic layer 22 also includes a local database or register 222 which may be used to store fault data or other notifications from the ECUs 211 in the component diagnostic layer 21.

In the vehicle diagnostics layer 23, fault data from a plurality of the application service modules 221 is analyzed and interpreted for each of a number of customer-facing vehicle features. These user features may be regarded as vehicle features that are available to assist the user in driving the vehicle, or other vehicle features to provide entertainment, comfort, etc., to a vehicle user. Such vehicle features may include, for instance, a direction indicator feature or a lane change assist feature.

Diagnostics may then be performed at a 'vehicle level' or 'vehicle feature level' for each of the different vehicle user features that are provided based on the fault data from the relevant application service modules 221. In particular, the vehicle diagnostic layer 23 includes a platform diagnostic services module 231 connected to the application service modules 221 in the system diagnostic layer 22. Diagnostic notifications may then be sent from the platform diagnostic services module 231 to the diagnostic testers 24 either on-board or off-board the vehicle. The vehicle diagnostic layer 23 also includes a central database or register 232 which may be used to store fault data or other notifications from the application service modules 221 in the system diagnostic layer 22. The central database 232 also includes a current list of application services provided by the vehicle, which may be added to or amended over time.

Figure 3:
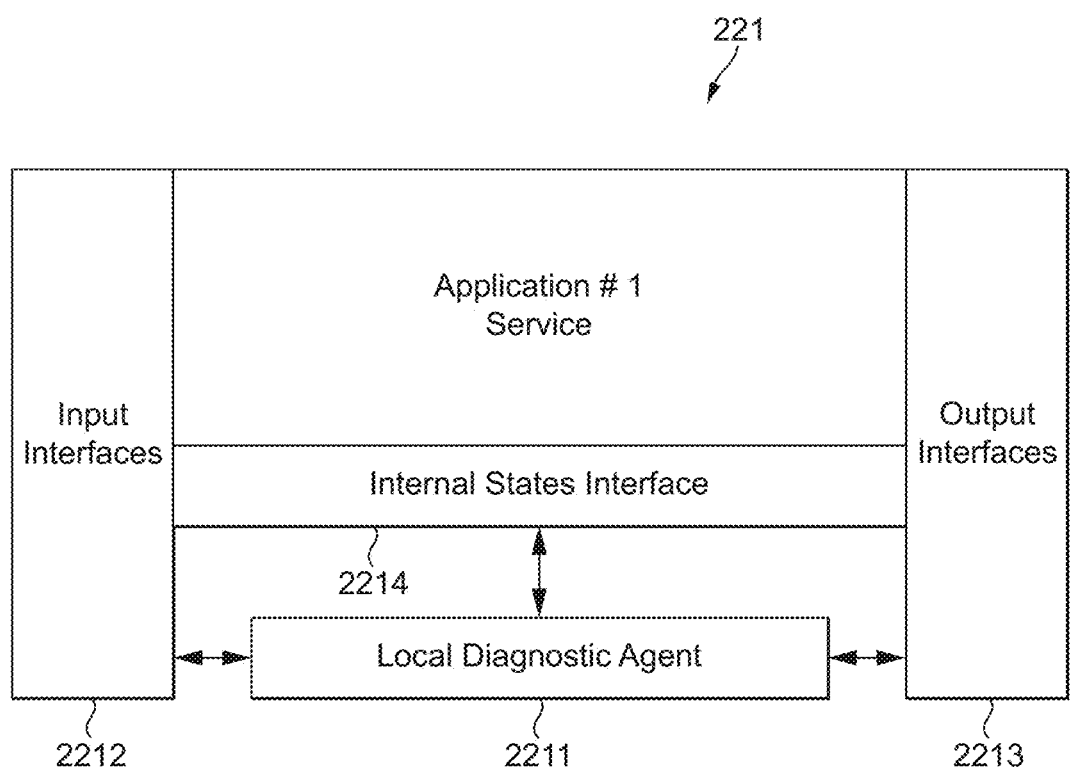
FIG. 3 illustrates an application service module of the diagnostics electrical architecture of FIG. 2.

FIG. 3 illustrates one of the application service modules 221 in greater detail. In particular, each of the application service modules 221 includes a local diagnostic agent 2211, analogous in some ways to the diagnostic servers 212 of the ECUs. In particular, the local diagnostic agent 2211 is integral with the associated application service module 221 and has direct access to all of the inputs to, and outputs from, the module 221, as well as direct access to the internal states of the application service module 221. That is, the local diagnostic agent 2211 is connected to respective interfaces of the inputs 2212, outputs 2213 and internal states 2214 of the module 221. The local diagnostic agent 2211 may then perform diagnostics at a 'service level' of the hierarchical network architecture 20 based on the accessed data (which can include fault data received from a number of the ECUs 211, for example).

Figure 4:
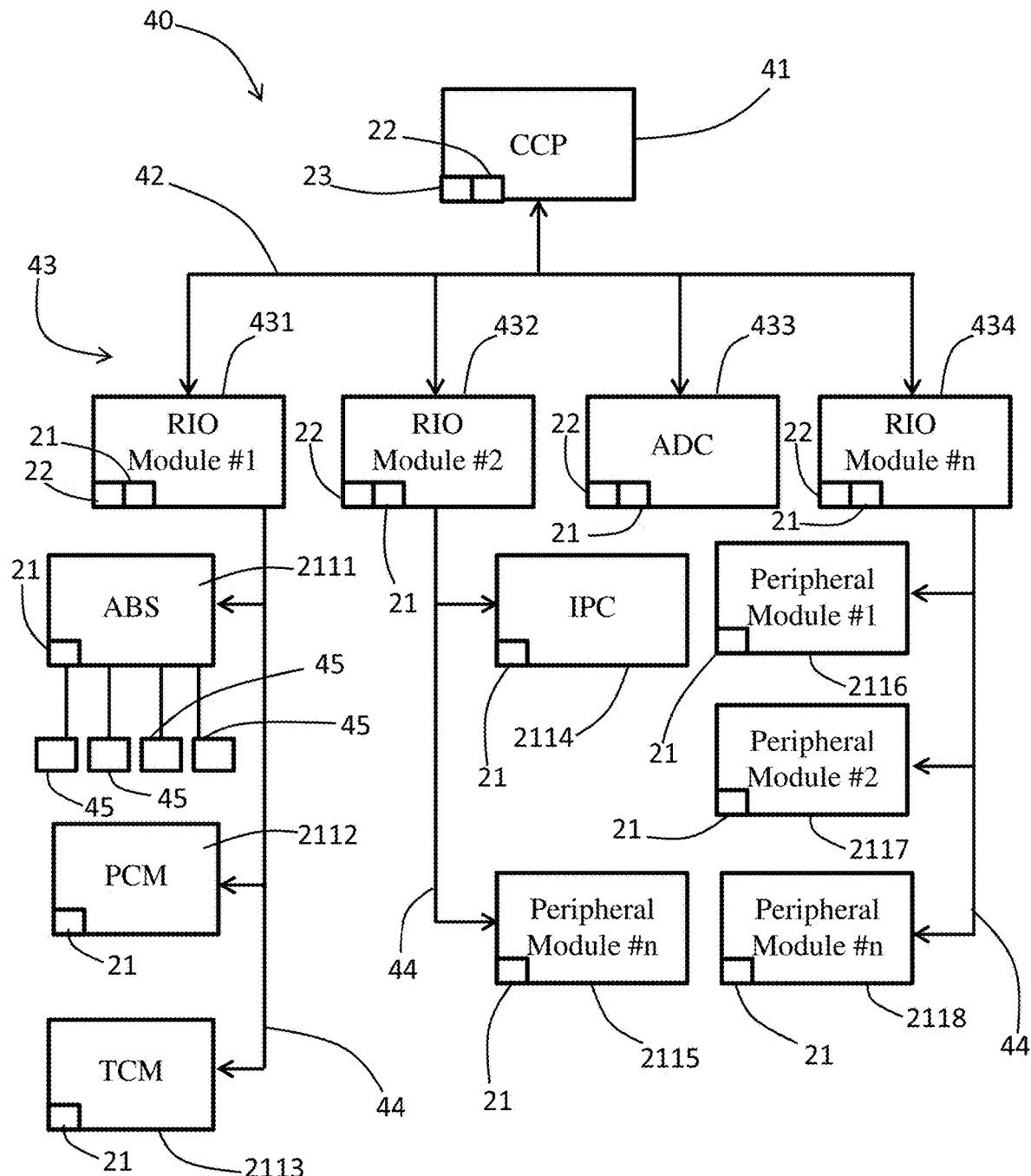
FIG. 4 illustrates a vehicle network architecture comprising a number of computing devices, the vehicle network architecture indicating where layers of the diagnostics electrical architecture of FIG. 2 are hosted.

FIG. 4 illustrates a vehicle network architecture 40 including a number of connected computing devices disposed in the vehicle. The network architecture 40 includes a central compute platform (CCP) 41. The CCP 41 is connected via an Ethernet data backbone 42 to a number of other compute platforms in the form of domain controllers or zonal compute platforms (CPs), or remote input/output (RIO) modules 43. Each of these CPs and RIOs 43 are further connected to a number of the ECUs 212 via conventional networks 44 such as CAN, FlexRay or LIN.

The computing devices may be provided by suitable software running on any suitable computing substrate using conventional or customer processors and memory. Some of the computing devices may use a common computing substrate (for example, they may run on the same server) or separate substrates, or one or some of the computing devices may themselves be distributed between multiple computing devices.

In the illustrative described example, the CCP 41 is connected to four CPs and RIOs 43 along the Ethernet backbone network, in particular to three RIO modules 431, 432, 434 and a ADC 433. A first of the RIOs 431 is connected to three ECUs 211 along the conventional network 44, in particular to an ABS module 2111, a PCM 2112 and a TCM 2113. The ABS module 2111 is further connected to four wheel speed sensors 45 for respective ones of the four wheels of the vehicle. A second of the RIOs 432 is connected to an IPC 2114 and a number of other peripheral modules or ECUs 2115 along the conventional network 44. An nth one of the RIOs 434 is also connected to a number of peripheral modules 2116, 2117, 2118 along the conventional network 44.

The different diagnostic layers 21, 22, 23 of the hierarchical diagnostic architecture 20 are hosted on different computer devices or modules of the vehicle network architecture 40. In particular, the vehicle diagnostic layer 23 is hosted on the CCP 41, the system diagnostic layer 22 is hosted on the CP/RIOs 43 and/or the CCP 41, and the component diagnostic layer 21 is hosted on the ECUs 211 and/or the CP/RIOs 43, as indicated in FIG. 4.

Figure 5:
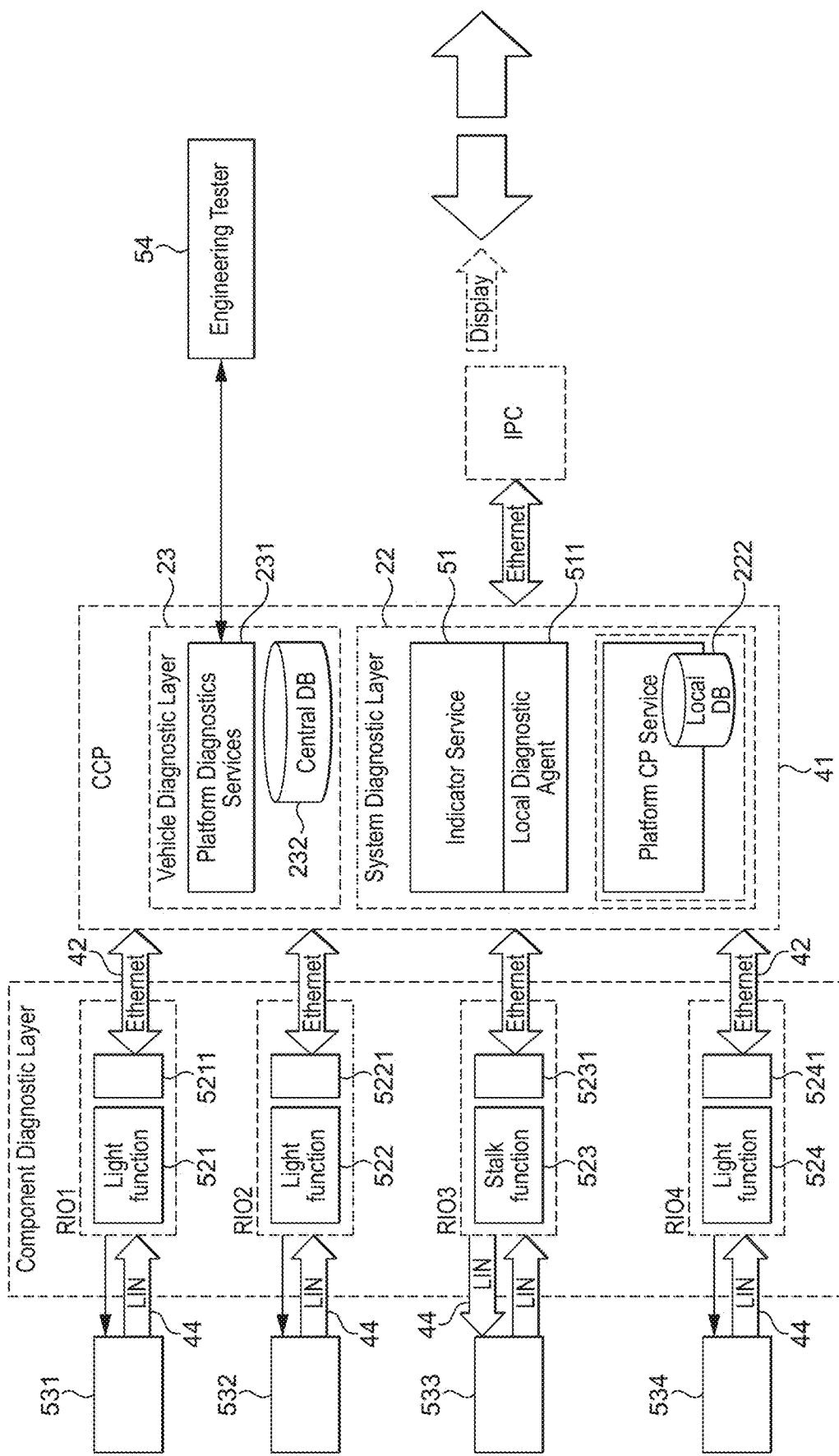
FIG. 5 illustrates the vehicle diagnostics electrical architecture of FIG. 2 for a vehicle direction indicator feature.

FIG. 5 illustrates an example of how the hierarchical diagnostics electrical architecture 20 may be used for a vehicle user feature in the form of a direction indicator feature. The direction indication feature has been decomposed into one application service 51 in the system diagnostic layer (or second diagnostic layer) 22, and four functions 521, 522, 523, 524 in the component diagnostic layer (or first diagnostic layer) 21. In the described example, both the vehicle diagnostic layer 23 and the system diagnostic layer 22 are hosted on the CCP 41, and the component diagnostic layer 21 is hosted on the RIOs 43. The four function components or modules 521, 522, 523, 524 are each hosted on a different one of the RIOs 43. The four function components 521, 522, 523, 524 each have an associated diagnostic server 5211, 5221, 5231, 5241.

In the described example, the four functions 521, 522, 523, 524 include three light functions 521, 522, 524 and a stalk function 523. Each of the functions 521, 522, 523, 524 receives sensor data from respective sensors 531, 532, 533, 534 connected thereto via the conventional networks 44, specifically the LIN in the case. In particular, the sensors include sensors associated with different indicator lights on the vehicle, e.g. at the front or rear of the vehicle, or on a wing mirror. Data from each of the function modules 521, 522, 523, 524 is transmitted to the indicator service module 51 via the Ethernet backbone network 42.

Regarding diagnostic capabilities, each of the diagnostic servers 5211, 5221, 5231, 5241 may perform diagnostic operations on the received sensor output data together with the input/output connections of the function modules 521, 522, 523, 524. Diagnostic notifications, for example in the form of fault codes, are transmitted to the indicator application service 51 and, in particular, the local diagnostic agent 512 of the service 51 perform service-level diagnostics on the received diagnostic notifications from the function modules 521, 522, 523, 524 and also the internal states of the indicator module 51.

As shown in FIG. 5, an off-board engineering diagnostic tester 54 is connected to the platform diagnostics services module 231 in the vehicle diagnostic layer 23. As there is only one application service in the present example— namely, the indicator service 51—then there is no vehicle- or feature-level triage of diagnostic notifications in the vehicle diagnostic layer 23. The availability of the indicator service 51 is stored in the central database 232. The engineering tester 54 may be made aware of the indicator service 51, or the availability of the indicator service 51 may be sent to the engineering tester 54, so that diagnostic messages relating to the indicator service 51 may be sent to the engineering tester 54. In particular, the local diagnostic agent 512 may generate a group diagnostic notification based on its diagnostic operations.

The vehicle diagnostics hierarchical electrical architecture 20 shown in FIG. 2 provides the opportunity to provide additional diagnostic capabilities—some of which have been mentioned above—that are not supported by known diagnostics electrical architectures, such as the flat, non-hierarchical diagnostics electrical architecture 10 illustrated in FIG. 1. Such additional diagnostic capabilities of the hierarchical diagnostics electrical architecture 20 are described below.

Event/Fault Monitoring and Reaction Triage

As described above, the component diagnostic layer 21 will be responsible for ECU- or module-level diagnostics, such as sensor or actuator diagnostics, input/output control, and diagnostic routine execution, as is the case in current architectures. However, in the hierarchical diagnostic structure 20, the system diagnostic layer 22 is arranged to perform higher-level strategic diagnostics and event/fault monitoring. The system diagnostic layer 22 may also be arranged to generate quality of service data at the system level to provide an understanding of network performance. The vehicle diagnostic layer 23 assesses the quality of services notified by the system diagnostic layer 22 by performing appropriate vehicle-level triage in order to generate predictive event notifications relating to network performance.

The reaction to an event/fault notification in each diagnostic layer is determined based on the events/faults detected in that particular diagnostic layer. The event/fault reaction is also cascaded to a higher layer for event/fault notification triage. The higher layer evaluates and determines whether any amendment is necessary to the event/fault reaction in the lower layer, or whether inhibition of the event/fault reaction in the lower layer is needed.

Figure 6:
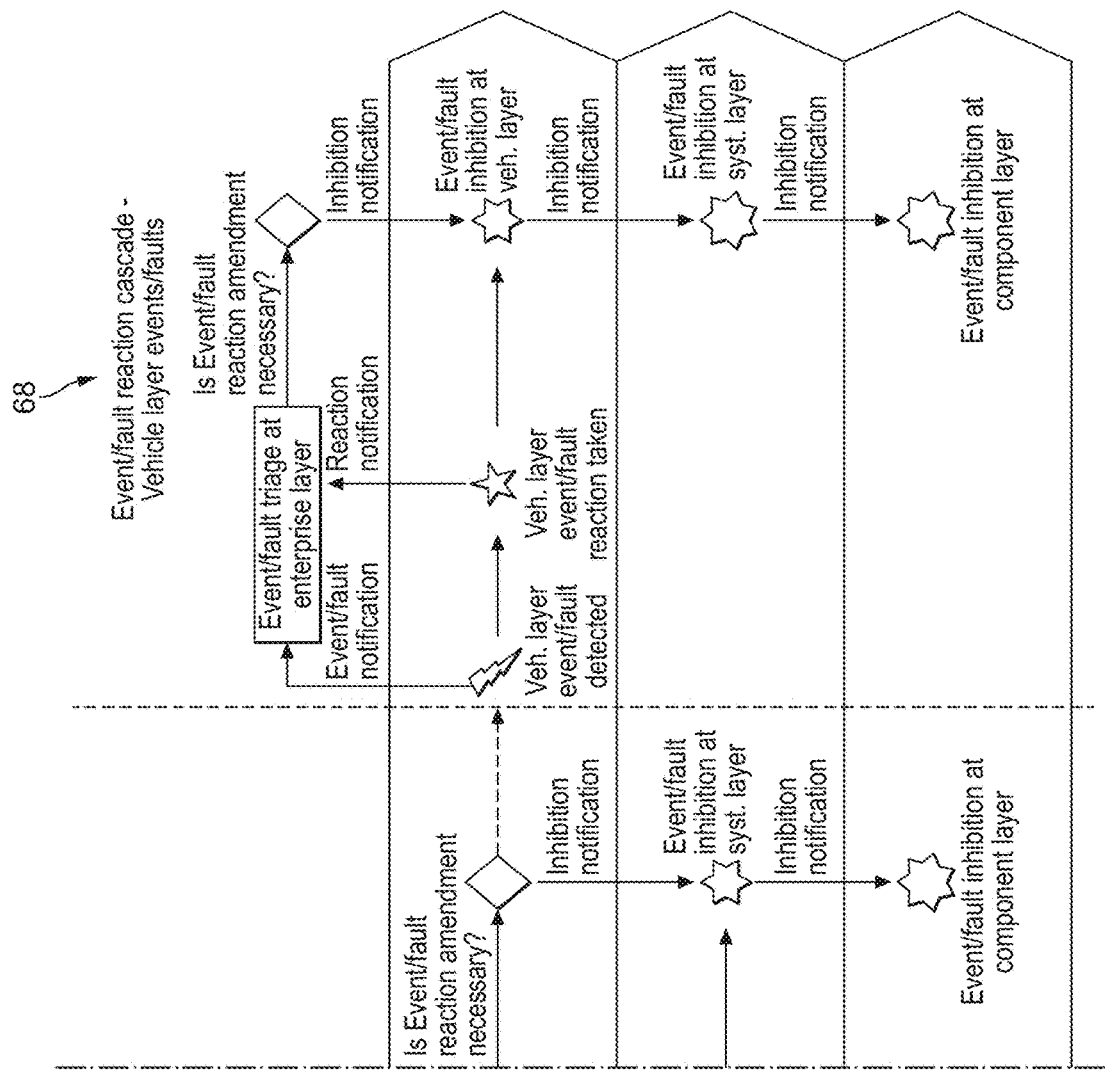
FIG. 6 schematically indicates the transmission of diagnostic notifications between layers of the vehicle diagnostics electrical testing architecture of FIG. 2 for triage of the diagnostic notifications.

Triaging of event/fault notifications across diagnostic layers is described further with reference to FIG. 6. In particular, FIG. 6 illustrates hierarchical event/fault monitoring and the cascading of event/fault reactions or inhibitions. In the case of an event/fault in the component layer—indicated by numeral 60—an event/fault is detected or determined 61 in the component layer 21 by a diagnostic server of an ECU. The ECU generates a reaction 62 to the event/fault at the component level 21. The ECU also generates a notification 63 that is transmitted to the system diagnostic layer 22, in particular to a local diagnostic agent of an application service module. At the component layer 21, the ECU also generates a notification 64 in relation to the reaction 62 taken in response to the detected event/fault 61. At the system level 22, the local diagnostic agent then analyses the received event/fault and subsequent reaction notifications 63, 64, and possibly other event/fault notifications from other ECUs or components in the component layer 21, to determine whether the reaction 62 is having, or has had, the desired effect, or whether amendment of inhibition of the reaction 62 is needed. If amendment or inhibition is needed then an amendment/inhibition notification 65 is generated in the system layer and transmitted to the component layer 21 so that the event/fault reaction 62 is amended or inhibited 66, as appropriate.

FIG. 6 also illustrates how system-level events/faults—indicated by numeral 67—are sent to the vehicle layer 23 for triage in a similar manner to component-level events/faults. Note that the inhibition notification from the vehicle layer can cascade all the way back to the component layer 21.

Furthermore, FIG. 6 illustrates how vehicle-level events/faults—indicated by numeral 68—are sent to a so-called enterprise layer 69 for triage in a similar manner to above. The enterprise layer 69 is hosted off-board the vehicle, i.e. outside the vehicle diagnostic architecture 20, and therefore can provide computationally heavy processing, machine learning services, clustering and regression techniques for supervised and unsupervised learning of various vehicle events and fault notifications originating from diagnostic layers in the diagnostic architecture 20. The enterprise diagnostic layer 69 receives up-to-date versions of the on-board central databases from many different vehicles—such as the central database 232 in the present example—which can then be used to facilitate complex machine learning algorithms to perform trend analysis and event/fault forecasting.

With reference to FIG. 4, an example of failure scenarios involving wheel speed signals is described to highlight the benefits of on-board triaging of notifications that may be performed using the hierarchical diagnostic architecture 20.

For instance, if a first one of the wheel speed sensors 45 develops a fault then this will be detected by the diagnostic server in the ABS module 2111, which will generate a diagnostic trouble code (DTC), e.g. that there is short or open circuit to the wheel speed sensor 45. Referring to FIG. 4, the failure of the wheel speed sensor 45 will also be detected by the RIO module #1 431, which will also generate a DTC, e.g. that invalid serial data from the wheel speed sensor 45 has been received. In a flat, non-hierarchical diagnostic structure, both of these separate DTCs would be reported and then an analysis of the underlying or root fault would need to be undertaken. In contrast, in the hierarchical diagnostic architecture 20 triaging of the DTCs may be performed in the system diagnostic layer 22—in this case hosted by the RIO module #1 431—to establish the root fault causing the multiple DTCs. In this case, the triaging establishes that the wheel speed sensor 45 is faulty and therefore only reports the DTC code generated by the ABS module 2111.

As another example, and with continued reference to FIG. 4, consider a scenario in which three of the wheel sensors 45 develop a fault. In this case, the ABS module 2111 will generate three DTCs, i.e. that there is short or open circuit to each of the three wheel speed sensor 45. The RIO module #1 431 will also generate three DTCs, i.e. that invalid serial data from each of the three faulty wheel speed sensor 45 has been received. Unlike in the previous example, however, if three wheel speed sensors are faulty then a calculation of vehicle speed cannot be made. For instance, the vehicle speed calculation may be made in the RIO module #1 431 or in the ABS module 2111. There are many modules of the vehicle that make use of the calculated vehicle speed signal. The IPC module 2114 uses the vehicle speed signal, e.g. to display the vehicle speed to the driver. The RIO module #2 432 therefore generates a DTC as the vehicle speed signal is not received along the Ethernet network 42, e.g. invalid vehicle speed signal, and the IPC module 2114 also generates a DTC, e.g. signal plausibility failure in that the steering column cannot be unlocked, or the engine cannot be started, because of an incorrect vehicle speed. Also, the ADC module 433 also makes use of the vehicle speed signal, e.g. as part of a cruise control function, and so it generates a DTC as the vehicle speed signal is not received along the Ethernet network 42, e.g. invalid vehicle speed signal. In addition, the PCM 2112 may use wheel speed sensor signal to calculate vehicle speed, and therefore will generate a DTC when it is unable to do so, e.g. signal calculation failure. The TCM 2113 may use wheel speed sensor signals to calculate vehicle speed for correlation with output shaft speed, and also to calculate input shaft speed, and so the TCM 2113 generates two separate DTCs that it is unable to calculate either. In a flat, non-hierarchical diagnostic structure, each of these nine separate DTCs would be reported and then an analysis of the underlying or root fault would need to be undertaken. In contrast, in the hierarchical diagnostic architecture 20 triaging of the DTCs may be performed in the system diagnostic layer 22—in this case hosted by the domain controllers 431, 432, 433—and in the vehicle diagnostic layer 23—in this case hosted in the CCP 41—to establish the root fault causing the multiple DTCs. In this case, the triaging establishes that three of the wheel speed sensors 45 are faulty and therefore only reports the three DTC codes associated with the wheel speed sensor faults generated by the ABS module 2111.

As a further example, consider that the communication bus 44 connected to the RIO module #1 431 is off/faulty. In this case, the RIO module #1 431 would generate a DTC to this effect. The ABS, PCM and TCM 2111, 2112, 2113 are all on this communication bus, and so each of these modules also generates a DTC to this effect. The RIO module #2 432 and ADC 433 need to communicate with the ABS module 2111 and so each generate a DTC that communication with the ABS module 2111 has been lost. Similarly, the IPC module 2114 needs to communicate with the ABS module 2111 and so generates a DTC that communication with the ABS module 2111 has been lost. In a flat, non-hierarchical diagnostic structure, the 'communication bus off' DTC and the 'lost communication with ABS' DTC would be reported and then an analysis of the underlying or root fault would need to be undertaken. In contrast, in the hierarchical diagnostic architecture 20 triaging of the DTCs may be performed in the system and vehicle diagnostic layers 22, 23 to determine that communication bus being off or faulty is the root cause, and therefore only the 'communication bus off' DTC is reported.

Functional Operating Range Monitoring

Component-based diagnostics allows for the detection of physical faults of sensors and actuators. However, it does not allow determination as to whether received sensor data is fit for purpose for the application that is using it. That is, the received data may be outside of a range that is useful for a particular application even if the sensor is not faulty as such. The quality of service may therefore be improved by introducing functional operating range monitoring for received sensor data.

The component diagnostic layer 21 monitors physical faults with the sensors and actuators. This includes physical I/O faults, e.g. short circuit or open circuit faults. DTC logs are created upon detection of such faults, as well as higher diagnostic layers are notified. The system diagnostic layer 22—in particular, the local diagnostic agents 2211 of the application service modules 221 in the described example—performs functional operating range monitoring of the sensor data. Specifically, the system diagnostic layer 22 assesses the functional validity of the received sensor data in given operating states of a particular system, and fuses received data from other sources in the given context.

The system diagnostic layer 22 will create a DTC log and generate an event notification for the vehicle diagnostic layer 23 if it is determined that the received data is not fit for purpose even though no physical faults have been detected in the component diagnostic layer 21. In addition, as described above, the system diagnostic layer 22 performs physical fault triage and determines fault reaction/inhibition when notified by the component diagnostic layer 21.

Once the system diagnostic layer 22 notifies the vehicle diagnostic layer 23 then the vehicle diagnostic layer 23 will assess the event notification through vehicle-level supervisory services against vehicle states and power mode. In particular, the vehicle diagnostic layer 23 will perform triage of event notifications from the system layer 22. The vehicle layer 23 notifies vehicle events to the enterprise layer 69 and creates vehicle event logs. As an outcome of this assessment the vehicle diagnostic layer 23 will generate a predictive event notification, if necessary, i.e. an event notification predicting possible sensor or actuator failure. As such, the diagnostic architecture 20 is not limited to reactive event notifications.

Figure 7:
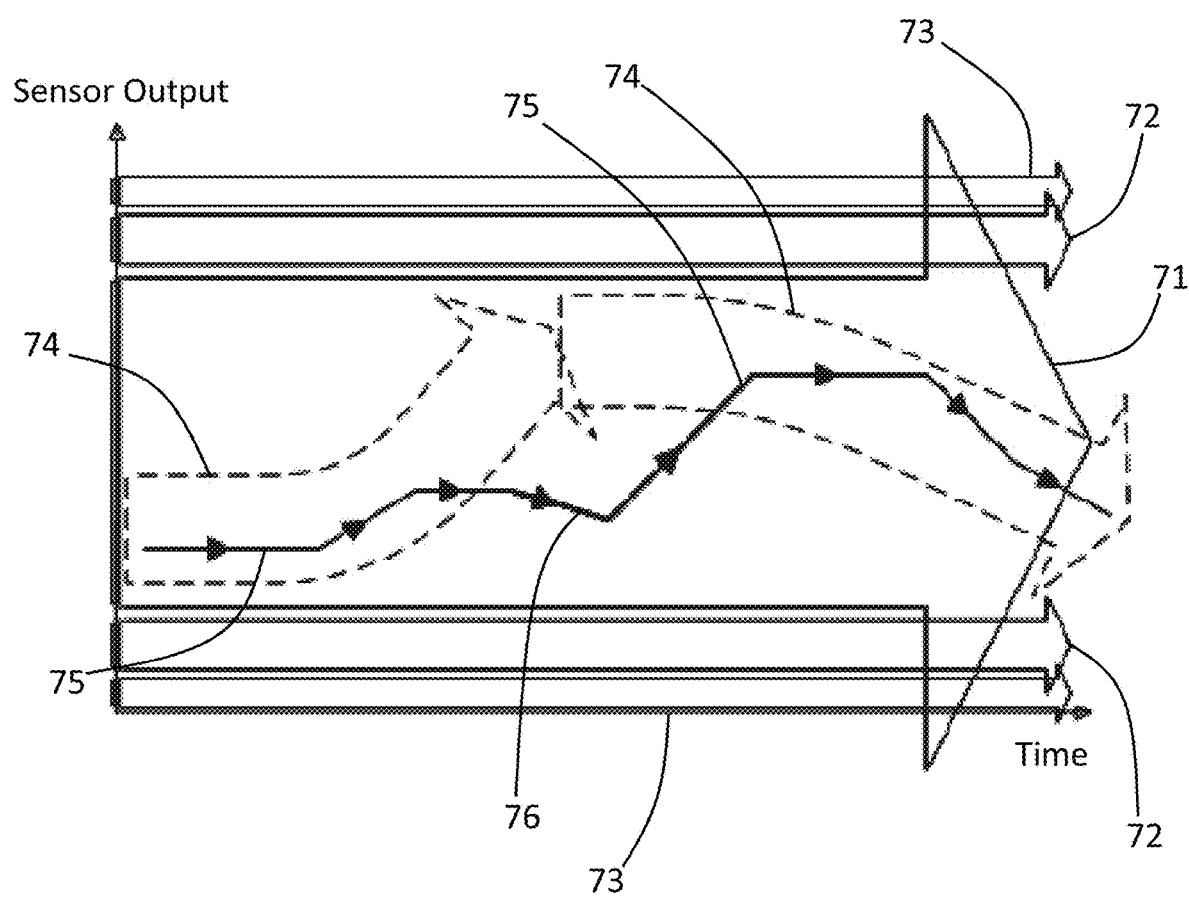
FIG. 7 schematically illustrates how received sensor output to be analyzed by the diagnostics electrical architecture of FIG. 2 varies with time relative to a functional operating range.

FIG. 7 schematically illustrates how received sensor output may vary with time relative to thresholds or functional ranges for a particular sensor associated with one of the ECUs 211. In particular, the sensor may have a so-called static operating range 71. This may be configured in a design phase of the diagnostics architecture and may be set based on the sensor driver circuit. The static operating range 71 may define a range of output values from the sensor that are allowable during normal operation of the sensor. Either side of the static operating range 71 may be ranges 72 of sensor output values that indicate the sensor signal is out of range, and which result in event notifications being generated in the component diagnostic layer 21 if the sensor output is in either of these ranges. Further ranges 73 of sensor output values either side of the ranges 72, i.e. having outputs further from the static operating range 71, indicate a short circuit to the battery, or an open circuit. if the sensor output is in either of these ranges 73 then a DTC notification is generated in/from the component diagnostic layer 21.

FIG. 7 also indicates a functional operating range prediction 74 that is within the static operating range 71. This dynamic predicted range 74 is determined in the system diagnostic layer 22 based on data fusion/plausibility against a reference model. This is useful to ensure that received sensor data is fit for purpose for the application that is using it, even though the sensor is not faulty as such, i.e. the sensor values are not outside of the static operating range 74. An event notification may be generated in/from the system diagnostics layer 22 to report whether the received sensor values are inside (indicated at 75) or outside (indicated at 76) of the predicted functional operating range 74.

Network Event/Fault Monitoring and Reporting

As Ethernet communication is typically unicast, i.e. between a single sender and receiver, then generally it does not allow for network traffic capture with physical intrusive access, for example by physically tapping the network or accessing the switch mirror. The hierarchical diagnostic layer 20 may be used to provide a remote monitoring service of the network.

The component diagnostic layer 21 continues to monitor various physical layer network faults, and monitor and report physical fault locations on the network cable to enhance the serviceability/autonomous resolution response plan (RRP). The system diagnostic layer 22 offers advanced network event/fault monitoring services such as, for example, network remote monitoring, intrusion detection client, quality of service, network traffic statistics, CPU bottleneck events, and network packet drop events. Once notified by the system diagnostic layer 22, the vehicle diagnostic layer 23 assesses network performance or health, and generates reactive events.

Secure Event Monitoring and Reporting

The component diagnostic layer 21 offers platform services for secure logging agents, in particular detecting and notifying component-level secure events. This can include, for example, ECU hardware interface checks and debug access attempts, verification of signed software, integrity check for secure boot loader, and mobile air-conditioning failure.

The system diagnostic layer 22 also offers platform services for secure logging agents, in particular detecting and notifying system-level secure events. This can include, for example, implausible global synchronized counter, and secure on-board communication key not available. The platform services may also include creating and managing secure log entry, managing logging lifecycle, and securing log entry storage.

The vehicle diagnostic layer 23 also offers platform services for secure logging agents, in particular detecting and notifying vehicle-level secure events. This can include, for example, successful/failed diagnostic access authorization attempt by an external client. Furthermore, the vehicle diagnostic layer 23 also offers platform services for secure logging masters, for example aggregation of secure log entries from clients, and exporting a secure vehicle log report.

Legislative On-Board Diagnostics (OBD)

The hierarchical diagnostic architecture 20 provides clear separation between an on-board diagnostics (OBD) scan tool through diagnostic CAN protocol (Diag_CAN) and a non-OBD tool accessed by the DoIP protocol.

OBD request/response messages are 'tunnelled' through the Ethernet bus 42 by packaging the OBD CAN messages into Ethernet messages. This has been proposed to fulfil stringent timing requirements on OBD communication. Referring to FIG. 4, this means that diagnostic communications from a legislative scan tool tester off-board the vehicle in the enterprise diagnostic layer will bypass the vehicle diagnostic layer 23 in the CCP 41 and the Ethernet backbone network 42 straight to a relevant RIO module 43 for OBD connectivity (separate from other RIO modules).

The following description outlines how the hierarchical architecture 20 permits simultaneous access of multiple different diagnostic testers. In particular, arbitration management across multiple diagnostic testers is described, and how this is handled across different layers 21, 22, 23 of the architecture 20. Both proximity diagnostics use cases using wired testers—specifically, legislative OBD scan tool, OEM wired testers, and third party testers—and remote/on-board diagnostics use cases using an on-board tester—specifically, OEM cloud tester, and SOTA and connected diagnostics servers in the enterprise layer—are considered.

Legislative OBD (On-Board Diagnostics) Scan Tool

In the vehicle diagnostic layer 23, the OBD tester connects to the ECU hosting the vehicle layer 23 which, in the described example, is the CCP 41. Depending on the legislative OBD protocol supported, the OBD scan tool communicates either over a dedicated diagnostics CAN bus between the OBD connector and the CCP 41, or directly on the Ethernet bus 42. In order to fulfil stringent OBD timing requirements the CCP 41 tunnels the OBD request/response frames through the Ethernet backbone 42 without performing a protocol payload conversion between diagnostic CAN and Ethernet protocols. The CCP 41 hosts two diagnostic servers: a first server for all proximity diagnostics use cases; and, a second server for all remote/on-board diagnostics use cases. As such, any request from the OBD scan tool will always be processed independent from remote/on-board diagnostics communication at the vehicle layer 23, provided there is no other OEM wired tester attempting to access the vehicle layer 23 simultaneously.

In the system diagnostic layer 22, all OBD request/response frames are tunnelled through the Ethernet backbone 42 to the target RIO modules 43, which have OBD-relevant ECUs 211 connected to their sub-networks 44. As there is no protocol payload conversion by the CCP 41 in the vehicle layer 23, the target RIO modules 43 are able to quickly put the OBD frames in the underlying CAN sub-networks 44. The RIO modules 43 may host OBD-relevant application services on them, in which case those specific RIO modules 43 will consume OBD frames directly through their own component diagnostic layer interface.

In the component diagnostic layer 21, the target OBD-relevant ECU 211 hosts a dedicated diagnostic server 212 to support the OBD protocol. Generally, only one wired tester may be connected to the vehicle OBD connector, and so this dedicated server 212 is allocated for all proximity diagnostics use cases for all wired diagnostics testers (OBD and non-OBD wired testers). All OBD requests from external OBD testers may therefore always be supported independent from any other remote and on-board diagnostics use cases, and associated diagnostics communications.

Figure 8:
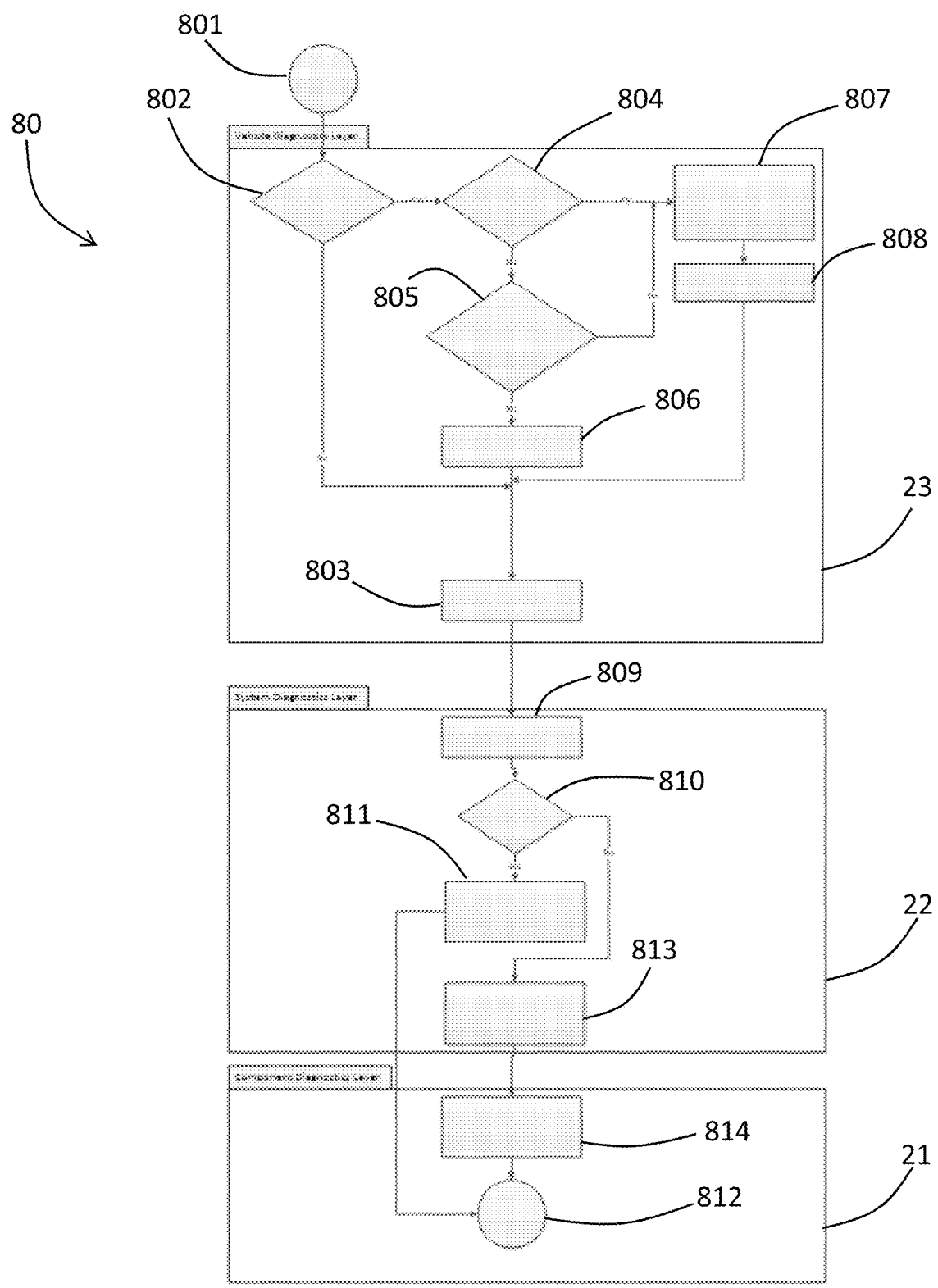
FIG. 8 illustrates the steps of a method of performing vehicle diagnostics using the vehicle diagnostics electrical architecture of FIG. 2.

FIG. 8 shows a flow diagram illustrating a method 80 of how multiple tester access may be managed at the different diagnostic layers 21, 22, 23 for an OBD scan tool. At step 801, a new OBD request from an OBD scan tool is received into the vehicle diagnostics layer 23. The following method steps are then performed in the vehicle layer 23. At step 802, it is determined whether proximity diagnostic communication is already in progress with any non-OBD wired tester. If no, then at step 803 the OBD frames are tunnelled through the Ethernet backbone 42, and no protocol payload conversion is necessary. If yes at step 802, however, then at step 804 it is determined whether the ongoing non-OBD request is being executed in a non-default session. If no at step 804, then at step 805 it is determined whether the new OBD request uses the same diagnostic resource as the on-going non-OBD diagnostics communications. If no at step 805, then at step 806 parallel operations between OBD and non-OBD requests is continued in the default session, and then the method 80 proceeds to step 803. If, however, the determination at either step 804 or 805 is yes then the method 80 proceeds to step 807, where the on-going proximity diagnostics session is aborted, i.e. receive/transmit communication is cancelled, and a negative response to the OEM wired tester is sent. Then at step 808 the lower diagnostic layers 21, 22 are informed to allocate the freed-up diagnostic resources to the new OBD requests, before the method 80 proceeds to step 803.

The following method steps are then performed in the system layer 22. At step 809 the tunnelled OBD frames from step 803 are received by the OBD-relevant RIOs 43 in the system layer 22. At step 810, it is determined whether any OBD-relevant RIO 43 is being targeted by the OBD scan tool. If yes then at step 811 the OBD-relevant RIOs 43 in the system layer 22 process the OBD requests using the dedicated diagnostics server configured for proximity diagnostics use cases. In this case, there is no processing in the component layer 21, which waits for the next OBD request at step 812. If, however, at step 810 the determination is no then at step 813 the OBD frames with Ethernet wrapper are unpacked by the relevant RIOs, and provided with a gateway on the sub-network 44 in the component layer 21.

In the component diagnostics layer 21, at step 814 the OBD requests are received from the system layer 22 and processed by the dedicated diagnostics server configured for proximity diagnostics use cases in OBD-relevant ECUs 211 in the component layer 21. The next OBD request is then waited for at step 812.

OEM Wired Testers (Engineering/Manufacturing/Service Testers)

In the vehicle diagnostic layer 23, OEM wired testers connect to the ECU hosting the vehicle layer 23 which, in the described example, is the CCP 41. Depending on the type of OEM wired tester, it will communicate with the CCP 41 over the Ethernet backbone 42 using either the UDS on DoIP or service-oriented diagnostics (SoD) protocol interface. If UDS on DoIP is used by the OEM wired tester, the platform diagnostics services module 231 supports the necessary protocol conversion between UDS on DoIP and SoD interfaces. As mentioned above, the CCP 41 hosts a first server for all proximity diagnostics use cases, and a second server for all remote/on-board diagnostics use cases. As such, any diagnostic request from an OEM wired tester will always be processed independently from remote/on-board diagnostics communication at the vehicle layer 23, provided there is no other OBD scan tool trying to access the vehicle layer 23 simultaneously.

In the system diagnostic layer 22, all of the RIO modules 43 hosting the system layer 22 host two diagnostic servers. As such, any diagnostic request from an OEM wired tester will always be processed separately/independently from remote/on-board diagnostics communication at the system layer 22. In particular, the two different diagnostics servers provide the capability to run two completely different diagnostic sessions with different diagnostic contexts, thus achieving true parallel diagnostic operation. If in order to fulfil the commands/requests from OEM wired testers diagnostic communication with the component layer 21 is necessary, then the RIO modules 43 use the on-board tester hosted on the individual RIO modules 43 to access diagnostic data from all of the ECUs 211 underneath that host the component layer 21.

In the component diagnostic layer 21, if the target ECU 211 is an OBD-relevant ECU 211 then it hosts two diagnostics servers 212: one for on-board use cases; and, one for proximity use cases. If, on the other hand, the target ECU 211 is not OBD-relevant then it is sufficient for the ECU 211 to support only one diagnostics server 212 for all use cases to optimise the overall design of the layered architecture 20.

Figure 9:
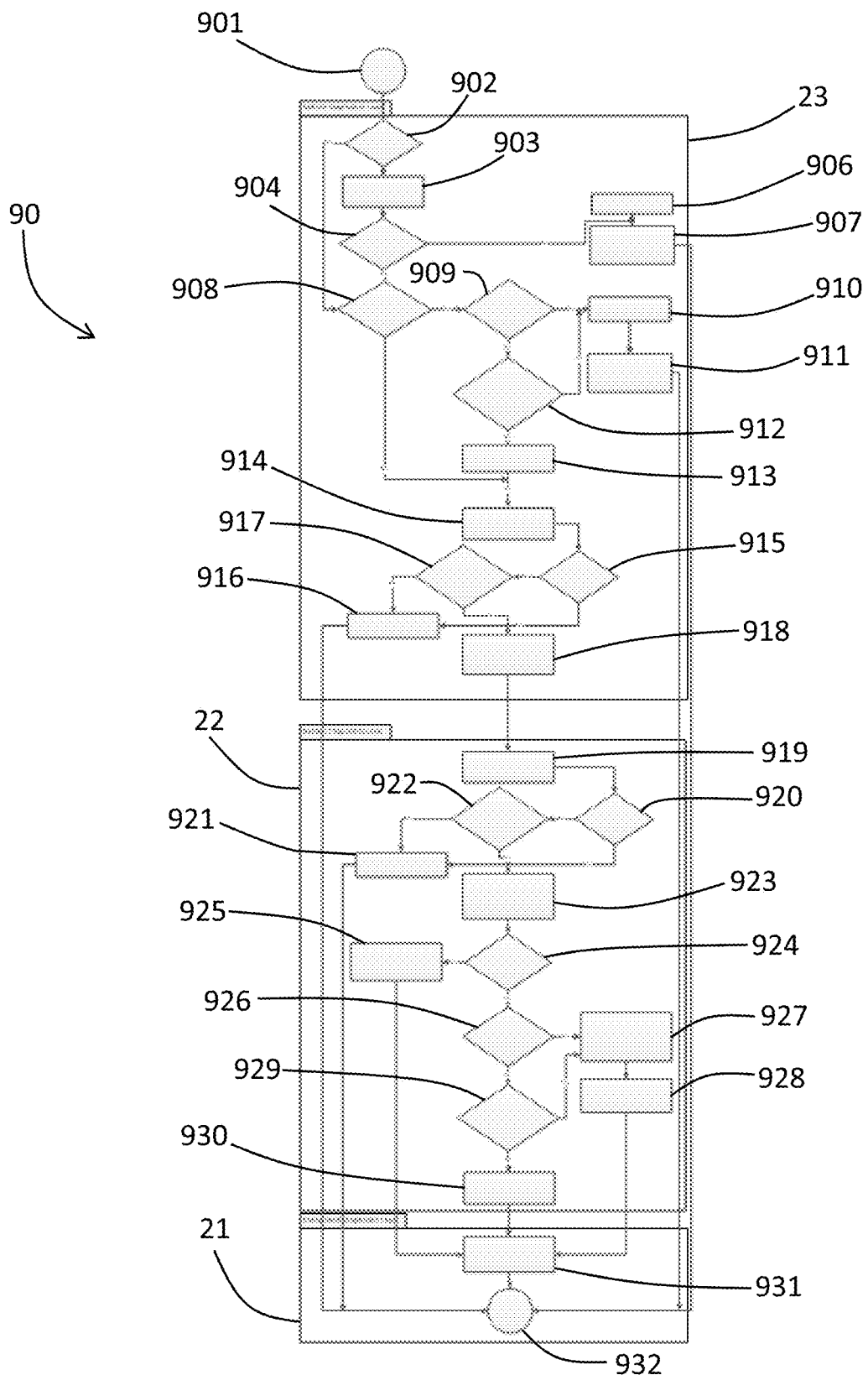
FIG. 9 shows a flow diagram illustrating an example of a method of how multiple tester access may be managed at the different diagnostic layers for a wired tester.

FIG. 9 shows a flow diagram illustrating a method 90 of how multiple tester access may be managed at the different diagnostic layers 21, 22, 23 for an OEM wired tester. At step 901, a new OEM wired tester diagnostic request is received into the vehicle diagnostics layer 23. The following method steps are then performed in the vehicle layer 23. At step 902 it is determined whether the vehicle is already in a proximity diagnostics lifecycle state. If no, then at step 903 the lifecycle manager is requested to transition from the current lifecycle state to a proximity diagnostics state. Then at step 904 it is checked whether the transition to the proximity diagnostics state is allowed by the lifecycle manager. If no, then at step 906 additional information regarding the rejection is obtained from the lifecycle manager, and the new proximity diagnostic request from the OEM wired tester is rejected. At step 907 a negative response is sent to the OEM wired tester layer with additional information on the cause of rejection. The method 90 then comprises waiting for the next OEM wired tester diagnostic request.

If, however, the determination is yes at either step 902 or 904 then the method 90 proceeds to step 908, where it is determined whether OBD communication is already in progress with a legislative OBD scan tool. If yes, then at step 909 it is determined whether the new proximity diagnostic request from the OEM wired tester should be executed in a non-default session. If yes, then at step 910 the new proximity diagnostic request is rejected. Then at step 911 a negative response is sent to the OEM wired tester. If, however, at step 909 the determination is no then at step 912 it is determined whether the new proximity diagnostic request uses the same diagnostic resources as the on-going OBD communication. If yes, then the method 90 proceeds to step 910 and the request is rejected. If, however, the determination is no then at step 913 parallel operation between the OBD and non-OBD requests are continued in a default session.

Following on from this—and also if the determination at step 908 is no—at step 914 the diagnostic requests are processed by the dedicated server on the CCP 41 configured for proximity diagnostics. Then at step 915 it is determined whether the vehicle layer 23 is being targeted by the tester. If yes, then at step 916 the diagnostic request is processed in the vehicle layer 23 and the response is sent. If, however, the determination is no at step 915 then at step 917 it is determined whether participation of the system layer 22 is needed. If no then the method proceeds to step 916; however, if yes then at step 918 then a new diagnostic task for the system layer 22 is initiated. The on-board tester is used to initiate diagnostic communication with all of the RIOs 43 that host the system layer 22.

The following method steps are then performed in the system layer 22. At step 919 diagnostic requests are processed by the dedicated diagnostic server on the RIOs 43 configured for proximity diagnostics. Then at step 920 it is determined whether the system layer 22 is being targeted by the tester. If yes, then at step 921 the diagnostic request is processed by the system layer 22 and the response is sent. If, however, at step 920 the determination is no then at step 922 it is determined whether participation of the component layer 21 is necessary for the on-going diagnostic request. If no then the method 90 proceeds to step 922; however, if yes then at step 923 a new diagnostic task fir the component layer 21 is initiated. The on-board tester is used to initiate diagnostic communication with all of the ECUs 211 connected over the non-Ethernet sub-network 44 underneath the RIO 43. At step 924 it is determined whether the ECU 211 being addressed in the component layer 21 is OBD relevant. If yes, then at step 925 the diagnostics requests for proximity diagnostics are processed by the dedicated diagnostic servers configured for proximity diagnostics on the ECUs 211. If no, then at step 926 it is determined whether the new diagnostic request for proximity diagnostics should be executed in a non-default session. If yes, then at step 927 the on-going remote diagnostics session is aborted, i.e. receive/transmit is cancelled, and a negative response is sent to the OEM remote tester. Then at step 928 the lower diagnostic layers 21 are informed to allocate the freed-up diagnostic resources to the new proximity diagnostics requests. If, however, the determination at step 926 is no then at step 929 it is determined whether the new diagnostic request for proximity diagnostics uses the same diagnostic resources as the on-going diagnostic request for remote diagnostics. If yes, then the method 90 proceeds to step 927. If no, however, at step 930 parallel operations between the diagnostic requests for proximity and the remote diagnostics in the default session are continued.

In the component diagnostics layer 21, a message is received as the output of step 925, 928 or 930 and at step 931 the diagnostic request is processed in the component layer 21 and a response is sent. The architecture then waits for the next diagnostic request (step 932).

Third Party Testers/Insurance Dongle

In the vehicle diagnostic layer 23, all third party testers/insurance dongles use the same OBD connector and OBD interface as the OBD scan tool. Diagnostic requests from third party testers/insurance dongles are therefore always processed independently from remote/on-board diagnostic communication at the vehicle layer 23, provided that there is no other OEM wired tester accessing the vehicle layer 23 simultaneously.

In the system and component diagnostic layers 22, 21, diagnostic requests from third party testers/insurance dongles are treated in the same manner as legislative OBD use cases described above.

OEM Cloud Tester

In the vehicle diagnostic layer 23, an OEM cloud tester will use the on-board tester to access diagnostic data from the vehicle. Depending on the architecture 20, multiple off-board entities from the enterprise layer 69—such as an OEM cloud tester, SOTA, connected diagnostics—may attempt to access the same on-board tester, or there may be one on-board tester per entity from the enterprise layer 69. In the case in which only one on-board tester is used, then it will either have multi-threading capability to execute different requests from different enterprise layer entities in parallel, or there will be arbitration between the different enterprise layer entities attempting to access the same on-board tester. Once the on-board tester receives a command from an enterprise layer entity, the on-board tester connects to the CCP 41, i.e. the ECU hosting the vehicle layer 23. The on-board tester uses the SoD protocol interface for on-board diagnostic communication. As mentioned above, the CCP 41 hosts two diagnostic servers: a first server for all proximity diagnostics use cases; and, a second server for all remote/on-board diagnostics use cases. As such, any diagnostic request from the on-board tester is always processed independently from the OBD/OEM wired tester diagnostic communication at the vehicle layer 23, once the OEM cloud tester has gained access to the on-board tester. Also as mentioned above, the two different diagnostics servers therefore provide the capability to run two completely different diagnostic sessions with different diagnostic contexts, thus achieving true parallel diagnostic operation. If in order to fulfil the commands/requests from OEM cloud tester diagnostic communication with the system layer 22 is necessary, then the CCP 41 uses the on-board tester hosted on the CCP 41 to access diagnostic data from all of the RIO modules 43 that host the system layer 22.

In the system diagnostic layer 22, any diagnostic request from an OEM cloud tester is always processed independently from an OBD/OEM wired tester diagnostic communication, once the OEM cloud tester has gained access to the on-board tester, because the RIO modules 43 hosting system layer 22 have two separate diagnostic servers.

In the component diagnostics layer 21, if the target ECU 211 is an OBD-relevant ECU 211 then it hosts two diagnostics servers 212: one of on-board use cases; and, one for proximity use cases. If, on the other hand, the target ECU 211 is not OBD-relevant then it is sufficient for the ECU 211 to support only one diagnostics server 212 for all use cases to optimise the overall design of the layered architecture 20.

SOTA (Software-Over-the-Air) and Connected Diagnostics Servers in the Enterprise Layer In the vehicle diagnostic layer 23, once an on-board tester receives a command from SOTA/connected diagnostics the on-board tester will connect to the CCP 41 (which hosts the vehicle layer 23). The on-board tester always uses the SoD protocol interface for diagnostic communication. Similarly to above, the two separate servers mean that diagnostic requests from the on-board tester are processed independently from the OBD/OEM wired tester, once the SOTA/connected diagnostics has gained access to the on-board tester. As above, the two different diagnostic servers in the system layer 22 provide the capability to run two different diagnostic sessions with different diagnostic contexts to achieve parallel diagnostic communication. If in order to fulfil the commands/requests from the SOTA/connected diagnostics servers diagnostic communication with the component layer 21 is necessary, then the RIO modules 43 use the on-board tester hosted on the individual RIO modules 43 to access diagnostic data from all of the ECUs 211 underneath that host the component layer 21.

In the component diagnostics layer 21, if the target ECU 211 is an OBD-relevant ECU 211 then it hosts two diagnostics servers 212: one of on-board use cases; and, one for proximity use cases. If, on the other hand, the target ECU 211 is not OBD-relevant then it is sufficient for the ECU 211 to support only one diagnostics server 212 for all use cases to optimise the overall design of the layered architecture 20.

Figure 10:
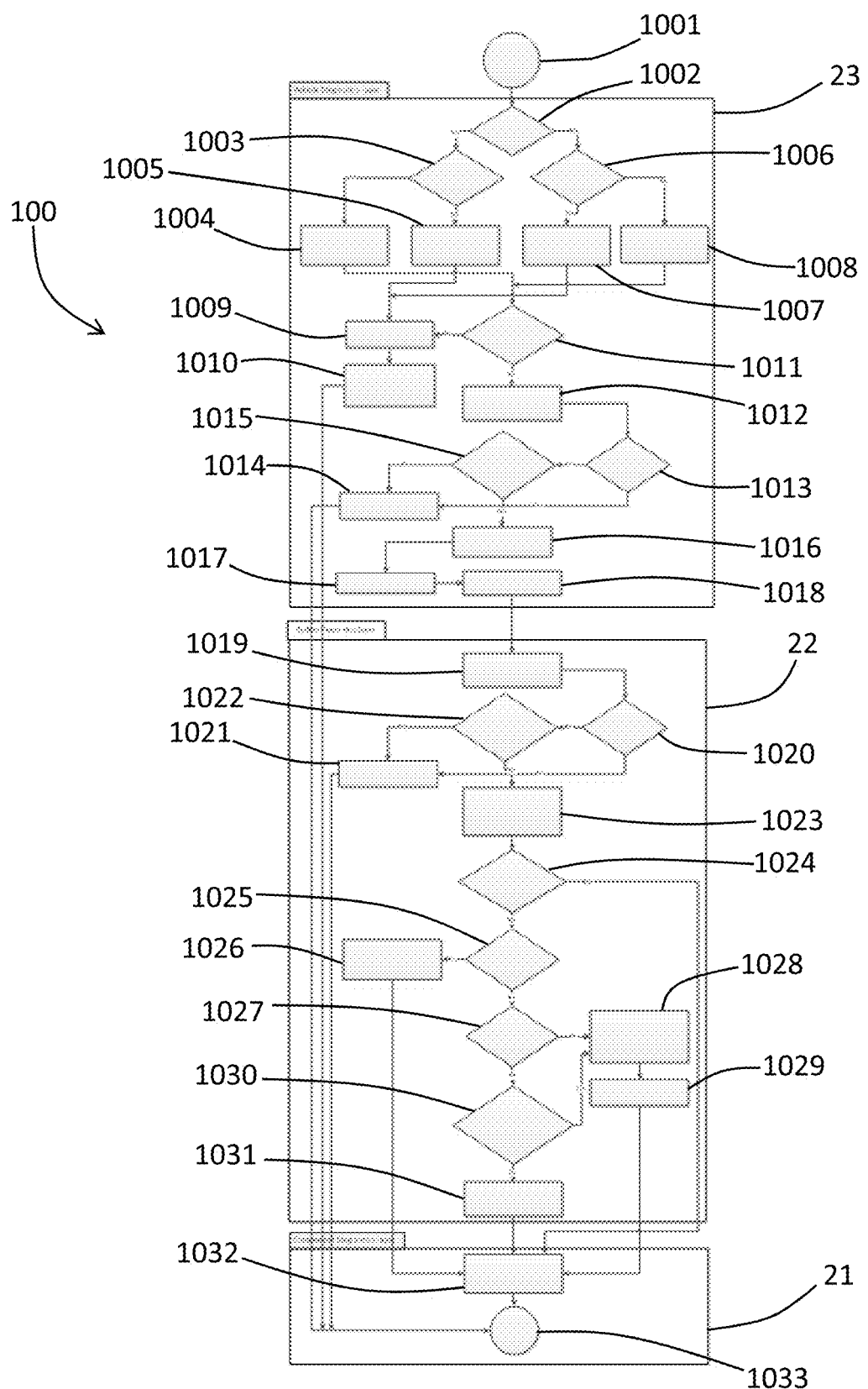
FIG. 10 shows a flow diagram illustrating an example of a method of how multiple tester access may be managed at the different diagnostic layers for a remote tester.

FIG. 10 shows a flow diagram illustrating a method 100 of how multiple tester access may be managed at the different diagnostic layers 21, 22, 23 for an OEM remote tester, e.g. a cloud tester, SOTA tester or connected diagnostics tester. At step 1001, a new remote diagnostics request is received from an OEM remote tester into the vehicle diagnostics layer 23. The following method steps are then performed in the vehicle layer 23. At step 1002 it is determined whether the vehicle is in a sleep/deep sleep state. If yes, then at step 1003 it is determined whether the new remote diagnostics request leads to intrusive diagnostics. If yes, then at step 1004 the vehicle wakes up and liaises with the platform lifecycle manager, and approval for remote diagnostics communication is obtained. If no, then at step 1005 non-intrusive diagnostics requests are not supported in the sleep/deep sleep state.

If, however, the determination at step 1002 is no, then at step 1006 it is determined whether the new remote diagnostics request leads to intrusive diagnostics. If yes, then at step 1007 intrusive diagnostics requests are not supported when the vehicle is not in the sleep/deep sleep state. If no, then at step 1008 the vehicle liaises with the platform lifecycle manager, and approval for remote diagnostics communication is obtained.

At step 1009, the output from step 1005 or 1007 is received, and the new remote diagnostics request is ignored. At step 1010 a negative response is sent to the enterprise layer off-board the vehicle, and then further requests are then awaited.

Alternatively, at step 1011, the output from step 1004 or 1008 is received, and it is determined whether remote diagnostics communication is allowed by the lifecycle manager. If no, then the method 100 proceeds to step 1009; however, if yes then at step 1012 diagnostic requests are processed by the dedicated diagnostic server on the CCP 41 configured for remote diagnostics. At step 1013 it is determined whether the CDS manager is being targeted by the tester. If yes, then at step 1014 remote diagnostic request is processed by the CDS manager and the response is sent. If, however, the determination is no at step 1013 then at step 1015 it is determined whether participation of the PDS is necessary for the on-going diagnostics request. If no, then the method proceeds to step 1014; however, if yes, then at step 1016 a request is sent to PDS for diagnostic access to the system diagnostic layer 22. At step 1017, diagnostic requests are processed by the dedicated server on the CCP 41 configured for remote diagnostics. At step 1018, a new diagnostic task for the system layer 22 is initiated, and the on-board tester is used to initiate diagnostic communication with all the RIOs 43 which host the system layer 22.

The following method steps are then performed in the system layer 22. At step 1019, diagnostic requests are processed by the dedicated diagnostic server on RIOs 43 configured for remote diagnostics. At step 1020, it is determined whether the system layer 22 is being targeted by the tester. If yes, then at step 1021 the diagnostic request is processed in the system layer 22 and the response is sent. If no, however, then at step 1022 it is determined whether participation of the component layer 21 is necessary for the on-going diagnostic request. At step 1023, a new diagnostic task for the component layer 21 is initiated, and the on-board tester is used to initiate diagnostic communication with all of the ECUs 211 connected over the non-Ethernet sub-networks 44 underneath the RIOs 43. At step 1024, it is determined whether proximity diagnostics communication is already in progress with the target ECU9s) in the component layer 21. If yes, then at step 1025 it is determined whether the ECU 211 being addressed in the component layer 21 is OBD relevant. If yes, then at step 1026 diagnostic requests for remote diagnostics are processed by the dedicated diagnostics servers configured for remote diagnostics of the ECUs 211. If, however, the determination is no at step 1025, then at step 1027 it is determined whether the new remote diagnostics request should be executed in the non-default session. If yes, then at step 1028 the on-board remote diagnostics session is aborted, i.e. transmit/receive communication is cancelled, and a negative response is sent to the OEM remote tester. At step 1029, the freed-up diagnostic resources for proximity diagnostic requests are allocated. If, however, at step 1027 the determination is no, then at step 1030 it is determined whether the new diagnostic request for proximity diagnostics uses the same diagnostic resources as the on-going diagnostic request for remote diagnostics. If yes, then the method 100 proceeds to step 1028; however, if no then at step 1031 parallel operation between diagnostic requests for proximity and remote diagnostics are continued in the remote session.

In the component diagnostics layer 21, a message is received as the output of step 1026, 1029 or 1031 and at step 1032 the diagnostic request is processed in the component layer 21 and a response is sent. The architecture then waits for the next diagnostic request (step 1033).

Figure 11:
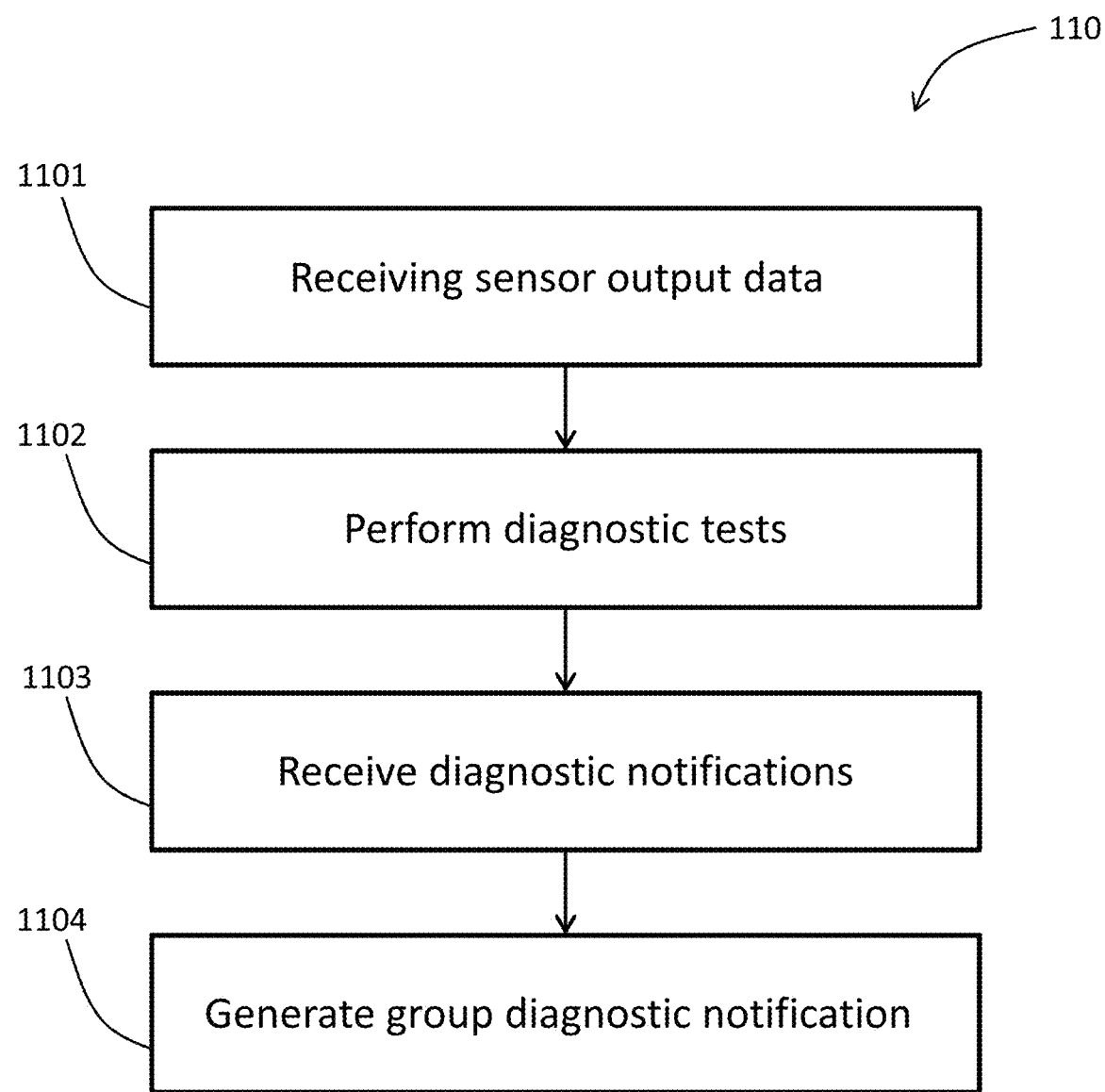
FIG. 11 outlines the steps of a method of performing vehicle diagnostics of a vehicle.

FIG. 11 outlines the steps of a method 110 of performing vehicle diagnostics of a vehicle. The vehicle has a network including a plurality of on-board computing devices for hosting a hierarchical diagnostics electrical architecture 20. The on-board computing devices include the CCP 41, a plurality of RIO modules 43, or other zonal computing devices or domain controllers, and a plurality of ECUs or other peripheral modules 211. The hierarchical diagnostics electrical architecture 20 has a component diagnostic layer having a plurality of electronic control units or other components/peripheral modules 211 each comprising a diagnostic testing module or diagnostic server 212. The hierarchical diagnostics testing architecture 20 also includes at least one supervisory diagnostic layer above the component diagnostic layer 21. In the described example, there are two supervisory layers, namely, the system and vehicle diagnostic layers 22, 23.

At step 1101, the diagnostic server modules 212 receive sensor output data from one or more on-board vehicle sensors. For instance, in the above example four wheel speed sensors 45 are described (shown in FIG. 4); however, it will be appreciated that the vehicle includes a variety of different sensors.

At step 1102, the diagnostic server modules 212 perform one or more diagnostic tests based on the received sensor output data and, more generally, to determine any faults associated with the sensors or ECU 211, e.g. input/output short or open circuit. The diagnostic server modules 212 generate one or more diagnostic notifications in dependence on the diagnostic operations performed. For instance, the diagnostic notification may be an event or fault notification to send to a higher layer of the architecture 20 and/or to log as an event in a database.

At step 1103, the at least one supervisory layer 22, 23 receives the diagnostic notifications from each of a group of the plurality of electronic control units 211. For instance, the system diagnostic layer 22 receives diagnostic notifications from ECUs 211 in the component diagnostic layer 21. In the described example, the system diagnostic layer 22 has a number of application service modules 221, each of which receive diagnostic notifications from a number of ECUs 211 in the component diagnostic layer 21.

At step 1104, the at least one supervisory layer 22, 23 aggregates the received diagnostic notifications to generate a group diagnostic notification. In the described embodiment, this can include the local diagnostic agent 2211 of each application service module 221 performing system-level diagnostic operations based on the received component-level diagnostic notifications and also on internal states of the application service module 221, inputs and outputs, etc. As described above, this aggregation in the system layer 22 may be in the form of triage, hierarchical event/fault monitoring, functional operating range monitoring, network event/fault monitoring, secure event monitoring, etc. The group diagnostic notification may be in the form of an event or fault notification to send to a higher layer of the architecture 20, and/or to log as an event in a database, and/or amendment/inhibition notification to send to a lower layer of the architecture 20.

The method may be replicated in a corresponding manner through other layers of the architecture 20, e.g. between the system and vehicle layers 22, 23. For instance, as mentioned, the local diagnostic agents 2211 in the system layer 22 generate (group) diagnostic notifications that may be sent to the vehicle layer 23. One or more modules of the vehicle layer 23—e.g. the platform diagnostic services module 231—may aggregate the received diagnostic communications from the system layer 22 in a similar manner to as described above in the system layer 22.

Figure 12:
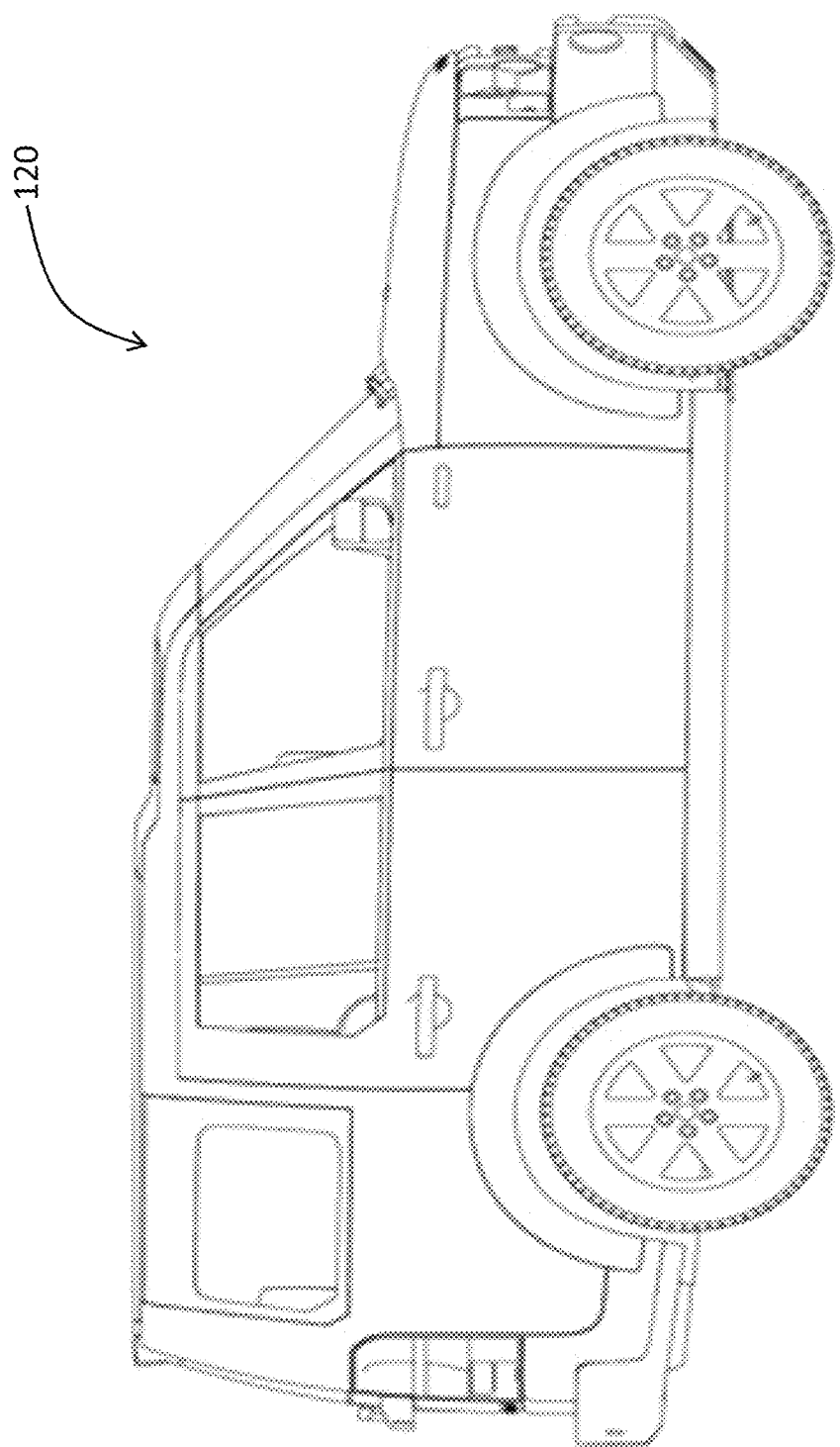
FIG. 12 shows a vehicle in accordance with an example of an aspect of the invention, the vehicle including the network architecture of FIG. 3 hosting the diagnostics electrical architecture of FIG. 2.

FIG. 12 shows a vehicle 120 having the network architecture 40 (not shown in FIG. 12) and hosting the hierarchical diagnostic architecture 20.

Embodiments of the invention are advantageous in that they provide an on-board diagnostic overview of the vehicle, which includes component-level diagnostics and supervisory-level diagnostics above the component-level diagnostics. Known architectures that are limited to component-level diagnostics on-board the vehicle are disadvantageous in that they can provide only a local view of faults to a diagnostic tester—that is, each ECU is diagnosed separately or in isolation. This can lead to multiple DTCs being reported for a single fault caused by a cascading effect of the single fault, which in turn necessitates potentially complex off-board fault finding and lack of autonomous repair or self-repair. As the number of actual faults increases, the overall number of fault codes/DTCs reported by the vehicle increases exponentially, leading to the diagnostic tester being flooded with often spurious and uncorrelated fault codes. Component-level diagnostics also is disadvantageous in that it leads to uncorrelated symptom/fault reactions in response to reported component-level data. Embodiments of the invention are therefore advantageous in that they provide hierarchical event/fault monitoring and reaction/inhibition, allowing for on-board correction of event reactions by interpreting the cause and consequence of events and reactions. Embodiments of the invention are therefore also advantageous in that they provide for triaging of diagnostic communications to determine the root cause of an event/fault so that only the root cause fault code is reported by the vehicle instead of an array of consequential fault codes that do not require direct action.

Embodiments of the invention are advantageous in that they allow for system-level on-demand self-tests (ODST) to be initiated to report the health status and trends at a system level. This is in contrast to component-level diagnostics which are limited to ECU ODST being initiated by a diagnostic tester to report component-level faults such as inputs/outputs not being connected, or not functioning as designed.

Embodiments of the invention are advantageous in that they provide logical and physical separation between external connectivity modules, i.e. diagnostic testers, and vehicle core modules, i.e. ECUs, from a diagnostic access point of view by introducing a layer of abstraction via the supervisory layers. This increases security and makes the diagnostic architecture less vulnerable to cyber-attacks. This is in contrast to non-hierarchical diagnostic architectures in which external diagnostic testers can establish direct communication paths to on-board ECUs.

Embodiments of the invention are advantageous in that they provide dynamic diagnostic resource conflict management. Specifically, embodiments of the invention advantageously permit simultaneous access of multiple different diagnostic testers, e.g. legislative scan tool, SOTA event, OBD scan tool, insurance dongle, etc. This is in contrast to non-hierarchical architectures which are limited to permitting access to one diagnostic tester at a time through a gateway module, even if the different testers require access to different system domains.

Embodiments of the invention are advantageous in that they provide a scalable and flexible on-board diagnostics interface, in particular via vehicle feature based diagnostics and/or application service based diagnostics, which is able to dynamically discover available diagnostic services. Application service or vehicle feature modules in the supervisory layers have an overview of the layers below. The invention is advantageous in that components or services that are added/updated are dynamically discoverable, as well as their relationship or association with vehicle features or services. The vehicle will be able to store and manage event/fault records for each vehicle feature or application service on-board in supervisory layer databases. In contrast, in point-to-point (p2p) communication of a non-hierarchical structure, each additional component added to the component layer needs the diagnostic tester to generate a specific p2p communication and, accordingly, the tester needs advance knowledge of which ECUs are present on the vehicle in order to obtain diagnostic data therefrom.

Embodiments of the invention are advantage in that they provide for fault/event prediction—in addition to reactive fault reporting—via symptom correlation in the supervisory layers, where the symptoms are not necessarily customer viewable. This is in contrast to non-hierarchical diagnostic architectures which can only provide reactive fault reporting.

Figure 13:
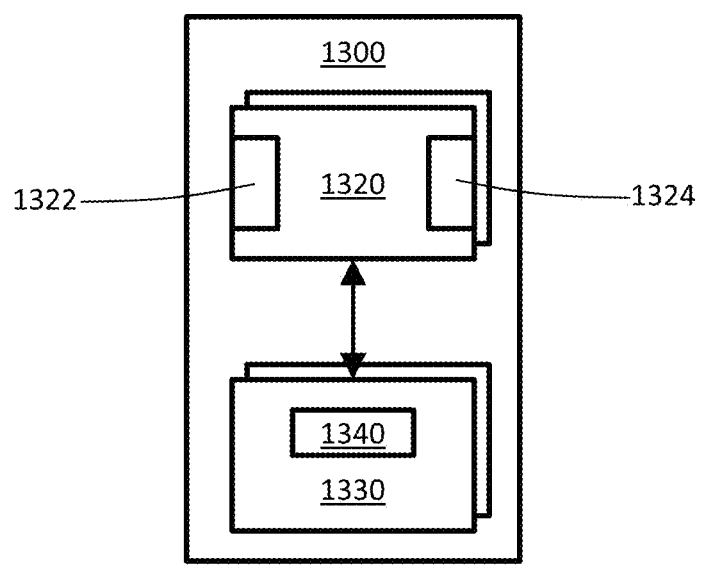
FIG. 13 illustrates a simplified example of an on-board computing device.

With reference to FIG. 13, there is illustrated a simplified example of an on-board computing device 1300 described above. The on-board computing device 1300 can comprise a control unit or computational device having one or more electronic processors (e.g., a microprocessor, a microcontroller, an application specific integrated circuit (ASIC), etc.), and may comprise a single control unit or computational device, or alternatively different functions of the or each on-board computing device 1300 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the on-board computing device 1300 to implement the control techniques described herein (including some or all of the functionality required for the method described herein). The set of instructions could be embedded in said one or more electronic processors of the on-board computing device 1300; or alternatively, the set of instructions could be provided as software to be executed in the on-board computing device 1300. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 13, the on-board computing device 1300 comprises at least one electronic processor 1320 having one or more electrical input(s) 1322 for receiving one or more input signal(s), and one or more electrical output(s) 1324 for outputting one or more output signal(s). The on-board computing device 1300 further comprises at least one memory device 1330 electrically coupled to the at least one electronic processor 1320 and having instructions 1340 stored therein. The at least one electronic processor 1320 is configured to access the at least one memory device 1330 and execute the instructions 1340 thereon.

The, or each, electronic processor 1320 may comprise any suitable electronic processor (e.g., a microprocessor, a microcontroller, an ASIC, etc.) that is configured to execute electronic instructions. The, or each, electronic memory device 1330 may comprise any suitable memory device and may store a variety of data, information, threshold value(s), lookup tables or other data structures, and/or instructions therein or thereon. In an embodiment, the memory device 1330 has information and instructions for software, firmware, programs, algorithms, scripts, applications, etc. stored therein or thereon that may govern all or part of the methodology described herein. The processor, or each, electronic processor 1320 may access the memory device 1330 and execute and/or use that or those instructions and information to carry out or perform some or all of the functionality and methodology describe herein.

The at least one memory device 1330 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

An example on-board computing device 1300 has been described comprising at least one electronic processor 1320 configured to execute electronic instructions stored within at least one memory device 1330, which when executed causes the electronic processor(s) 1320 to carry out the method as hereinbefore described. However, it will be appreciated that embodiments of the present invention can be realized in any suitable form of hardware, software or a combination of hardware and software. For example, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application. For example, all of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

In the above-described examples, the diagnostics electrical architecture in the vehicle has a component diagnostic layer and two supervisory layers, i.e. the system and vehicle diagnostic layers. In different examples, the diagnostics electrical architecture may have any suitable number of supervisory layers. In particular, a single supervisory diagnostic layer is possible.

In the above-described examples, application service modules are provided in the supervisory layer; however, in different examples signal-oriented diagnostics may be used throughout the hierarchical diagnostic architecture.

The invention claimed is:

1. A hierarchical diagnostics electrical architecture for a vehicle, the vehicle comprising a plurality of on-board computing devices for hosting the hierarchical diagnostics electrical architecture, and the hierarchical diagnostics electrical architecture comprising:
a component diagnostic layer comprising a plurality of electronic control units each comprising a diagnostics server module arranged to:
receive sensor output data from one or more on-board vehicle sensors; and
perform one or more diagnostic tasks based on the received sensor output data to generate one or more component-level diagnostic notifications; and
at least one supervisory diagnostic layer arranged to receive the component-level diagnostic notifications from each of a group of the plurality of electronic control units, wherein the at least one supervisory diagnostic layer is arranged to perform arbitration management across multiple diagnostic testers.

2. The hierarchical diagnostics electrical architecture according to claim 1, wherein the at least one supervisory diagnostic layer comprises a first supervisory diagnostic server for processing diagnostic requests from proximity diagnostic tools and a second supervisory diagnostic server for processing diagnostic requests from remote and/or on-board diagnostic tools.

3. The hierarchical diagnostics electrical architecture according to claim 2, wherein the first supervisory diagnostic server is configured, upon receipt of a new proximity diagnostic request, to:
determine whether diagnostic communication is already in progress with a remote or on-board diagnostic tool;
when communication is already in progress with a remote or on-board diagnostic tool, determine whether the new proximity diagnostic request uses the same diagnostic resources as the diagnostic communication already in progress; and
when the new proximity diagnostic request uses the same diagnostic resources as the diagnostic communication already in progress, reject the new proximity diagnostic request.

4. The hierarchical diagnostics electrical architecture according to claim 3, wherein the first supervisory diagnostic server is configured to:
when communication is already in progress with a remote or on-board diagnostic tool, determine whether the new proximity diagnostic request should be executed in a non-default session in which multiple parallel diagnostic sessions are not permitted; and
when the new proximity diagnostic request should be executed in a non-default session, reject the new proximity diagnostic request.

5. The hierarchical diagnostics electrical architecture according to claim 2, wherein the second supervisory diagnostic server is configured, upon receipt of a new remote or on-board diagnostic request, to:
determine whether diagnostic communication is already in progress with a proximity diagnostic tool;
when communication is already in progress with a proximity diagnostic tool, determine whether the new remote or on-board diagnostic request uses the same diagnostic resources as the diagnostic communication already in progress; and
when the new remote or on-board diagnostic request uses the same diagnostic resources as the diagnostic communication already in progress, reject the new remote or on-board diagnostic request.

6. The hierarchical diagnostics electrical architecture according to claim 5, wherein the second supervisory diagnostic server is configured to:
when communication is already in progress with a proximity diagnostic tool, determine whether the new remote or on-board diagnostic request should be executed in a non-default session in which multiple parallel diagnostic sessions are not permitted; and
when the new remote or on-board diagnostic request should be executed in a non-default session, reject the new remote or on-board diagnostic request.

7. The hierarchical diagnostics electrical architecture according to claim 2, wherein the second supervisory diagnostic server is configured to receive on-board diagnostic requests from an on-board diagnostic tester.

8. The hierarchical diagnostics electrical architecture according to claim 7, wherein the on-board diagnostic tester is configured to receive diagnostic requests from remote diagnostic tools and forward requests received from remote diagnostic tools to the second supervisory diagnostic server.

9. The hierarchical diagnostics electrical architecture according to claim 2, wherein the at least one supervisory diagnostic layer comprises a system diagnostic layer and a vehicle diagnostic layer at a higher level of the architecture than the system diagnostic layer;
   wherein the vehicle diagnostic layer comprises the first supervisory diagnostic server for processing diagnostic requests from proximity diagnostic tools and the second supervisory diagnostic server for processing diagnostic requests from remote and/or on-board diagnostic tools.

10. The hierarchical diagnostics electrical architecture according to claim 9, wherein the system diagnostic layer is hosted across a plurality of modules, each of said modules hosting a first system level supervisory diagnostic server for processing diagnostic requests from proximity diagnostic tools and a second system level supervisory diagnostic server for processing diagnostic requests from remote and/or on-board diagnostic tools.

11. The hierarchical diagnostics electrical architecture according to claim 9, wherein the supervisory-level diagnostic notifications comprise system-level diagnostic notifications in the system diagnostic layer, wherein one or more system-level diagnostic notifications is generated for each of a plurality of groups of electronic control units, and wherein vehicle diagnostic layer is arranged to receive the system-level diagnostic notifications and aggregate the received system-level diagnostic notifications to generate a vehicle-level diagnostic notification.

12. The hierarchical diagnostics electrical architecture according to claim 11, wherein the system diagnostic layer comprises a plurality of application service modules, each application service module being arranged to generate the one or more system-level diagnostic notifications for one of the groups of electronic control units; optionally each of the application service modules comprises a local diagnostic agent arranged to generate the one or more system-level diagnostic notifications, and wherein the one or more system-level diagnostic notifications includes a fault code associated with the one or more of the electronic control units, and/or input/output states of the application service module, and/or internal states of the application service module.

13. The hierarchical diagnostics electrical architecture according to claim 1, wherein the at least one supervisory diagnostic layer is arranged to aggregate the received component-level diagnostic notifications to generate a supervisory-level diagnostic notification.

14. The hierarchical diagnostics electrical architecture according to claim 13, wherein aggregating the received component-level notifications comprises at least one of:
   performing triaging of the component-level notifications;
   determining a validity of the received sensor output data based on a sensor data functional operating range determined in the at least one supervisory layer;
   performing supervisory-level network event/fault monitoring; and
   performing supervisory-level secure event/fault monitoring.

15. The hierarchical diagnostics electrical architecture according to claim 13, wherein the generated supervisory-level diagnostic notification is a reaction amendment or inhibition signal sent to one or more of the electronic control units in the component diagnostic layer.

16. The hierarchical diagnostics electrical architecture according to claim 15, wherein the component-level diagnostic notifications comprise notifications in relation to reactions taken in response to detected events and/or faults, and the supervisory diagnostic layer is arranged to analyze the reaction notifications, and to determine whether the or each reaction is having, or has had, the desired effect, or whether amendment or inhibition of the reaction is needed.

17. The hierarchical diagnostics electrical architecture according to claim 13, wherein the at least one supervisory layer comprises a diagnostic database arranged to store the generated supervisory-level diagnostic notifications.

18. A vehicle comprising the hierarchical diagnostics electrical architecture of claim 1.

19. A method of performing diagnostics in a hierarchical diagnostics electrical architecture of a vehicle, the vehicle comprising a plurality of on-board computing devices for hosting the hierarchical diagnostics electrical architecture, the hierarchical diagnostics electrical architecture comprising:
   a component diagnostic layer having a plurality of electronic control units each comprising a diagnostics server module; and,
   at least one supervisory diagnostic layer,
   the method comprising:
   receiving into the diagnostics server modules sensor output data from one or more on-board vehicle sensors;
   performing, by the diagnostics server modules, one or more diagnostic tasks based on the received sensor output data to generate one or more component-level diagnostic notifications; and
   receiving into the at least one supervisory layer the component-level diagnostic notifications from each of a group of the plurality of electronic control units,
   wherein the method further comprises performing, by the at least one supervisory diagnostic layer, arbitration management across multiple diagnostic testers.

20. A non-transitory, computer-readable storage medium storing instructions thereon that when executed by one or more processors causes the one or more processors to perform the method of claim 19.

* * * * *